United States Patent
Wang et al.

(10) Patent No.: US 12,527,248 B2
(45) Date of Patent: Jan. 20, 2026

(54) HIGH-SPEED PRECISION SEED METERING DEVICE THROUGH KINETIC-ENERGY-TYPE ROTATING AND THROWING AND SEED METERING CONTROL METHOD THEREOF

(71) Applicant: QINGDAO AGRICULTURAL UNIVERSITY, Qingdao (CN)

(72) Inventors: Baochao Wang, Qingdao (CN); Chenyuan Lu, Qingdao (CN); Dongwei Wang, Qingdao (CN); Shuqi Shang, Qingdao (CN)

(73) Assignee: QINGDAO AGRICULTURAL UNIVERSITY, Qingdao (CN)

( * ) Notice: Subject to any disclaimer, the term of this patent is extended or adjusted under 35 U.S.C. 154(b) by 0 days.

(21) Appl. No.: 19/023,673

(22) Filed: Jan. 16, 2025

(65) Prior Publication Data

US 2026/0013419 A1 Jan. 15, 2026

Related U.S. Application Data

(63) Continuation-in-part of application No. PCT/CN2024/130363, filed on Nov. 7, 2024.

(30) Foreign Application Priority Data

Jul. 11, 2024 (CN) .......................... 202410925232.1

(51) Int. Cl.
*A01C 7/10* (2006.01)
*A01C 7/04* (2006.01)
(Continued)

(52) U.S. Cl.
CPC ................ *A01C 7/102* (2013.01); *A01C 7/04* (2013.01); *A01C 7/14* (2013.01); *A01C 21/005* (2013.01)

(58) Field of Classification Search
CPC .. A01C 7/102; A01C 7/10; A01C 7/08; A01C 7/00; A01C 7/04; A01C 7/14; A01C 7/12; A01C 21/005; A01C 21/00
See application file for complete search history.

(56) References Cited

FOREIGN PATENT DOCUMENTS

| CN | 101589668 A | 12/2009 |
|---|---|---|
| CN | 106258126 A | 1/2017 |

(Continued)

OTHER PUBLICATIONS

First Office Action issued by the CN Intellectual Property Office on Aug. 16, 2024 for corresponding Application No. 202410925232.1.
(Continued)

*Primary Examiner* — Christopher J. Novosad
(74) *Attorney, Agent, or Firm* — Thomas Horstemeyer, LLP

(57) ABSTRACT

A high-speed precision seed metering device through kinetic-energy-type rotating and throwing and a seed metering control method thereof. Two motors are used to cooperatively control and achieve seed feeding and kinetic-energy-type rotating and throwing seed metering. A seed feeding motor rotates a seed feeding disc to be cooperated with an air suction device to suck seeds, and a throwing motor rotates a seed spoon to fetch seeds. After taking seeds, the seed spoon is accelerated by the throwing motor to provide initial kinetic energy for the seeds. After rotating to a throwing point, the seed spoon is decelerated by the throwing motor to throw the seeds. The throwing speed and the throwing angle of the seeds can be precisely controlled by adjusting the position of the throwing point and the rotational speed of the throwing motor.

6 Claims, 12 Drawing Sheets

(51) Int. Cl.
*A01C 7/14* (2006.01)
*A01C 21/00* (2006.01)

(56) References Cited

FOREIGN PATENT DOCUMENTS

| | | |
|---|---|---|
| CN | 217850932 U | 11/2022 |
| CN | 118451862 A | 8/2024 |
| RU | 2003108663 U | 10/2003 |

OTHER PUBLICATIONS

International Search Report issued by the Chin Intellectual Property Administration on Mar. 5, 2025 for corresponding Application No. PCT/CN2024/130363.

HIGH-SPEED PRECISION SEED METERING DEVICE THROUGH KINETIC-ENERGY-TYPE ROTATING AND THROWING AND SEED METERING CONTROL METHOD THEREOF

CROSS-REFERENCE TO RELATED PRESENT DISCLOSURE

This application is a continuation in part of International Application No. PCT/CN2024/130363, filed on Nov. 7, 2024, which claims the benefit and priority of Chinese Patent Present disclosure No. 2024109252321 filed with the China National Intellectual Property Administration on Jul. 11, 2024 and entitled as "HIGH-SPEED PRECISION SEED METERING DEVICE THROUGH KINETIC-ENERGY-TYPE ROTATING AND THROWING AND SEED METERING CONTROL METHOD THEREOF". The disclosures of the aforementioned applications are hereby incorporated by reference in their entireties.

TECHNICAL FIELD

The present disclosure relates to the technical field of intelligent agricultural machinery equipment and intelligent agriculture, and in particular to a high-speed precision seed metering device through kinetic-energy-type rotating and throwing and a seed metering control method thereof.

BACKGROUND

Precision sowing of single seed is a modern agricultural technology, which uses an advanced device and a precision seed metering control method to precisely position and deliver seeds when crops are planted. This technology has a wide demand and an important value in agriculture, which can avoid a waste of seeds, reduce the labor cost of thinning in a later period, and avoid over-dense and under-dense planting to increase yield.

The traditional precision sowing of single seed mostly uses an air-suction seed metering device, which applies negative pressure airflow to adsorb seeds on the seed metering disc. When the seeds rotate to a specific position with the seed metering disc, a mechanical structure blocks the seeds and the seed suction airflow, so that the seeds are separated from the seed metering disc at a specific position and fall into the soil along a seed tube under the action of gravity. The disadvantages of such seed metering device are that the initial speed of seeds under the action of gravity is low and the falling process takes a long time. Therefore, the working speed of such seeder can only be up to 5 to 6 km/h, so that high-speed seed metering cannot be achieved and the seeding efficiency is low.

At present, the existing high-speed seed metering device uses high-speed airflow to provide the initial speed for seeds on the basis of the traditional air-suction seed metering device, and the seeds are accelerated in the seed tube by the action of high-speed airflow (air blowing) and reaches a high speed when or after the seeds fall into the tube, so that the seeds can finally be ejected at a high speed at the end of the seed tube. The working speed of such seeder can be up to 18 km/h. However, the airflow force of such seed metering device cannot be precisely controlled, and the initial speed and the kinetic energy provided to seeds of different sizes are also different. Therefore, the speed, the trajectory and the landing point of seeds cannot be precisely controlled in the acceleration process, so that the spacing between plants cannot be precisely controlled during seeding. Moreover, there is also the risk of damaging seed plumule due to friction with the tube wall when seeds fall along the seed tube at high speed.

In addition, in order to prevent the seeds from bouncing and flying around after landing, it is generally required to throw seeds at zero speed during seeding, that is, the backward horizontal speed of the seeds is the same as the forward speed of the seeder, so that the horizontal speed of the seeds with respect to the ground is zero when the seeds land. However, the above two types of existing seed metering devices use seed tube to limit the motion trajectory of seeds. Due to a fixed shape of the seed tube, the seeds in the air-suction seed metering device described first fall along the seed tube under the action of gravity, and the speed and the angle of the seeds when the seeds leave the seed tube are basically constant, so that seeds can be thrown at zero speed only at a fixed vehicle speed. The seeds in the high-speed air-blown seed metering device described later all fall along the same shape of seed tube under the action of different air currents, and the exit angle is the same but the speed is different, so that seeds cannot be thrown at zero speed. The seeds can only be directly ejected into the soil under a pressing wheel. Because seeds are thrown at non-zero speed, the position will be changed when the seeds collide with the soil or the pressing wheel when the seeds exit, which will affect the seeding quality.

SUMMARY

In order to solve the problem that it is difficult for the existing seed metering device to effectively combine high-speed seed metering, landing control and zero-speed seed throwing, the present disclosure provides a high-speed precision seed metering device through kinetic-energy-type rotating and throwing and a seed metering control method thereof. The initial kinetic energy is provided to the seeds by using the rotating and throwing form of the motor, and the seeds are thrown at a specific angle and speed using the design of an acceleration section and a deceleration section of the motor, thereby achieving high-speed seed metering. And zero-speed seed throwing can be achieved by controlling a horizontal component of the throwing speed of the seeds at the throwing point to be consistent with the forward speed of the whole device, so that the landing position of the seeds can be precisely controlled.

In order to achieve the above purpose, the present disclosure uses the following technical scheme.

A high-speed precision seed metering device through kinetic-energy-type rotating and throwing is provided, where the seed metering device includes a seed feeding mechanism, a throwing motor and a seed spoon; the seed feeding mechanism feeds seeds to a picking point, the throwing motor has an output shaft vertically connected and fixed with a tail of the seed spoon and is configured to drive the seed spoon to rotate, and a head of the seed spoon fetches seeds at the picking point; the throwing motor rotates periodically, and each period is divided into an acceleration section and a deceleration section; after fetching seeds, the seed spoon is accelerated by the throwing motor to provide initial kinetic energy for the seeds; after rotating to a throwing point, the seed spoon is decelerated by the throwing motor to throw the seeds out, and a throwing speed and a throwing angle of the seeds are controlled by adjusting the position of the throwing point and rotational speed of the seed spoon at the throwing point.

In an embodiment, the seed feeding mechanism includes a seed feeding motor and a seed feeding disc, the seed feeding motor is connected with the seed feeding disc and drives the seed feeding disc to rotate, an edge of the seed feeding disc is evenly provided with a plurality of seed suction holes along a circumferential direction, the seed feeding disc is matchedly provided with an air suction device to suck seeds to positions of the plurality of seed suction holes and rotates to feed seeds to the picking point; when the seed spoon is overlapped with a position of corresponding seed suction hole at the picking point, linear speed of the seed spoon and linear speed of seeds in motion at a corresponding seed suction hole are consistent with each other to take seeds at the same speed.

A high-speed precision seed metering control method through kinetic-energy-type rotating and throwing is provided, including following steps:

step 1: determining a state of seeds at the throwing point and a speed of the seed spoon at the throwing point;

where a linear speed $V_{2p}$ and a throwing angle $\theta$ of the seeds during throwing are jointly determined by a horizontal distance $L_x$ and a vertical distance $L_y$ between the throwing point and a landing point, as well as a forward speed $V_t$ of a whole device and a gravity acceleration g, in which calculation formulas are as follows:

$$V_{2p} = \sqrt{V_{px}^2 + V_{py}^2};$$

$$\theta = \arctan\frac{V_{py}}{V_{px}};$$

where $V_{px}$ and $V_{py}$ are a horizontal component and a vertical component of the throwing speed of the seeds at the throwing point, respectively, $V_{px}$ and $V_t$ have the same size and opposite directions, in which:

$$V_{px} = V_t;$$

$$V_{py} = \frac{1}{2}\left(\frac{2L_y}{T_f} - gT_f\right);$$

$$T_f = \frac{L_x}{V_{px}};$$

where $T_f$ is a flight time from throwing to landing of the seeds;

a calculation formula of an angular speed $\omega_{2p}$ of the seed spoon at the throwing point is:

$$\omega_{2p} = \frac{V_{2p}}{r_2};$$

where $r_2$ is a radius for rotation motion of the seed spoon;

step 2: determining average angular speeds of a seed feeding disc and the seed spoon in rotation;

wherein the forward speed $V_t$ of the whole device and a seeding plant spacing $L_p$ are given, calculation formulas of an average angular speed $\omega_{1m}$ of the seed feeding disc and an average angular speed $\omega_{2m}$ of the seed spoon are as follows:

$$\omega_{1m} = \frac{2\pi V_t}{L_p Z};$$

$$\omega_{2m} = \frac{2\pi V_t}{L_p};$$

where Z is the number of seed suction holes on the seed feeding disc;

step 3: determining angular speeds of the seed feeding disc and the seed spoon at a picking time;

where a linear speed at which the seeds at the picking point move with the seed feeding disc is consistent with a linear speed at which the seed spoon fetches the seeds, an angular speed $\omega_{2q}$ of the seed spoon at the picking point and an angular speed $\omega_{1q}$ of the picking point of the seed feeding disc are obtained by following calculation formulas:

$$\omega_{2q} = 2\omega_{2m} - \omega_{2p};$$

$$\omega_{1q} = \frac{\omega_{2q} r_2}{r_1};$$

where $r_1$ is a radius for rotation motion of the seeds with the seed feeding disc;

step 4: obtaining rotating motion trajectories of the seed feeding disc and the seed spoon through angular speeds at various critical moments;

where the picking point is set as reference zero time and zero position, a speed curve $\omega_2(t)$ and a position curve $\theta_2(t)$ at which the seed spoon rotates for a period include an acceleration section and a deceleration section, which are divided into an acceleration process angular speed curve $\omega_{2a}(t)$, a deceleration process angular speed curve $\omega_{2d}(t)$, an acceleration process position curve $\theta_{2a}(t)$ and a deceleration process position curve $\theta_{2d}(t)$, and calculation formula of each curve trajectory is as follows:

$$\omega_{2a}(t) = \omega_{2m} - (\omega_{2m} - \omega_{2q})\cos\left(\frac{\pi}{T_{2a}}t\right) \ t \in [0, T_{2a});$$

$$\omega_{2d}(t) = \omega_{2m} + (\omega_{2m} - \omega_{2q})\cos\left[\frac{\pi}{T_{2d}}(t - T_{2a})\right] \ t \in [T_{2a}, T_{2s});$$

$$\theta_{2a}(t) = \int_0^t [\omega_{2a}(t)]dt \ t \in [0, T_{2a});$$

$$\theta_{2d}(t) = \int_{T_{2a}}^t [\omega_{2d}(t)]dt + \theta_{2a}(T_{2a}) \ t \in [T_{2a}, T_{2s});$$

where $[0, T_{2a})$ is an acceleration time period, $[T_{2a}, T_2)$ is a deceleration time period, $T_{2a}$ is a time spent for the seed spoon to move from the picking point to the throwing point, $$T_{2a} = \frac{\theta_{th}}{\omega_{2m}},$$

$T_{2s}$ is a time spent for the seed spoon to rotate for a period, $$T_{2s} = \frac{2\pi}{\omega_{2m}},$$

$T_{2d}$ is a time spent for the seed spoon to move from the throwing point to the picking point, $T_{2d}=T_{2s}-T_{2a}$;

wherein $\theta_{th}$ is an angle through which the seed spoon rotates from the picking point to the throwing point, and when there is an included angle $\theta_0$ between a line connecting the picking point of the seed spoon and a rotation center of the seed spoon and the horizontal direction, following formula holds:

$$\theta_{th} = \frac{3\pi}{2} - \theta_0 - \theta;$$

a speed curve $\omega_1(t)$ and a position curve $\theta_1(t)$ formed by the seed feeding disc rotating for one picking period are calculated as follows:

$$\omega_1(t) = \omega_{1m} + (\omega_{1q} - \omega_{1m})\cos\left(\frac{2\pi}{T_{2s}}t\right) \; t \in [0, T_{2s});$$

$$\theta_1(t) = \int_0^t \omega_1(t)dt \; t \in [0, T_{2s}).$$

In an embodiment, in the step 1, position compensation is carried out to allow the landing points of the seeds relative to the rotation center of the seed spoon are consistent, and $L_x$ and $L_y$ after position compensation for different throwing points are respectively:

$$L_x = L_{x0} + r_2 \sin\theta;$$

$$L_y = L_{y0} - r_2 \cos\theta;$$

where $L_{x0}$ and $L_{y0}$ are the horizontal distance and the vertical distance between the landing point and the rotation center of the seed spoon, respectively.

In an embodiment, a jitter curve $\theta_{2v}(t)$ is superimposed on the deceleration process position curve $\theta_{2a}(t)$ after time $T_{2a}$ of the throwing point in the step 4, $\theta_{2v}(t)$ is a cosine trajectory in which a position jitter amplitude is A and an angular frequency is $\omega_v$, calculation formulas are as follows:

$$\theta_{2v}(t) = -A + (\omega_v(t - T_{2a})) \; t \in [T_{2a}, T_{2a} + T_{2v});$$

$$T_{2v} = \frac{2\pi}{\omega_v};$$

where $(T_{2a}+T_{2v})<T_{2s}$, $T_{2v}$ is a time of one period of a cosine trajectory $\theta_{2v}(t)$.

Compared with the prior art, the present disclosure has the following beneficial effects. The rotational speed of the motor can be as high as thousands or even tens of thousands of revolutions per minute, which supports ultra-high-speed seed metering. In the present disclosure, the initial kinetic energy is provided to the seeds in the rotating and throwing form of the motor, and the seeds are thrown at a specific angle and speed using the design of an acceleration section and a deceleration section of the motor. Moreover, zero-speed seed throwing can be achieved by controlling a horizontal component of the throwing speed of the seeds at the throwing point to be consistent with the forward speed of the whole device. Zero-speed seed throwing can be achieved at any speed by adjusting the throwing angle and the throwing speed, so that the landing position of the seeds can be precisely controlled to achieve seed metering with fixed plant spacing. For seeds with different sizes, the same initial throwing speed and the same throwing angle can be provided, thereby achieve excellent consistency of the seed metering. Moreover, the linear speed of the seed spoon is the consistent with that of the seeds at the picking point, so that the seeds can be taken at the same speed without damage. The seed motion trajectory is not limited by the seed tube, which prevents high-speed seed metering from damaging seeds. The seed spoon can be applied to seeds of different varieties and sizes by changing the seed spoon. The seed metering device is simple and compact, maintenance-free, and high in reliability. The parameters such as the plant spacing and the landing position can be flexibly adjusted in the seed metering process, so that the seed metering device in strong in adaptability.

In the figures: 1—seed feeding motor, 2—throwing motor, 3—seed spoon, 4—seed feeding disc, 5—seed suction hole.

DETAILED DESCRIPTION OF THE EMBODIMENTS

The technical scheme in the present disclosure will be clearly and completely described with reference to the attached drawings in the embodiment of the present disclosure hereinafter. Obviously, the described embodiments are only some of the embodiments of the present disclosure, rather than all of the embodiments. Based on the embodiments of the present disclosure, all other embodiments obtained by those skilled in the art without paying creative labor belong to the scope of protection of the present disclosure.

Figure 1:
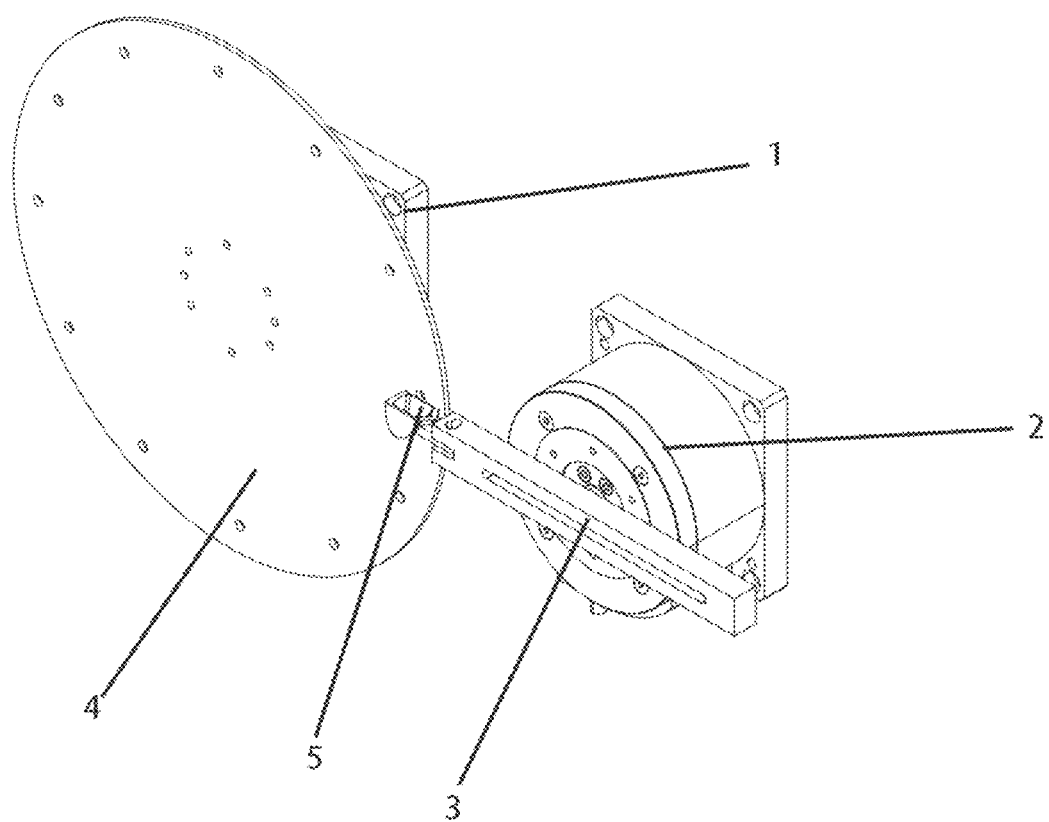
FIG. 1 is an axonometric schematic diagram of a high-speed precision seed metering device through kinetic-energy-type rotating and throwing according to an embodiment of the present disclosure.

As shown in FIG. 1, a high-speed precision seed metering device through kinetic-energy-type rotating and throwing, includes a seed feeding mechanism, a throwing motor 2 and a seed spoon 3. The seed feeding mechanism feeds seeds to a picking point. The throwing motor 2 has an output shaft vertically connected and fixed with a tail of the seed spoon 3 and is configured to drive the seed spoon 3 to rotate. A head of the seed spoon 3 fetches seeds at the picking point. The throwing motor 2 rotates periodically, and each period is divided into an acceleration section and a deceleration section. After fetching seeds, the seed spoon 3 is accelerated by the throwing motor 2 to provide initial kinetic energy for the seeds. After rotating to a throwing point, the seed spoon 3 is decelerated by the throwing motor 2 to throw the seeds out. The throwing speed and the throwing angle of the seeds are controlled by adjusting the position of the throwing point and the rotational speed of the seed spoon 3 at the throwing point.

The seed feeding mechanism may include a seed feeding motor 1 and a seed feeding disc 4. The seed feeding motor 1 is connected with the seed feeding disc 4 and drives the seed feeding disc 4 to rotate. An edge of the seed feeding disc 4 is evenly provided with a plurality of seed suction holes 5 along a circumferential direction. The seed feeding disc 4 is matchedly provided with an air suction device to suck seeds to the positions of the plurality of seed suction holes 5 and rotates to feed seeds to the picking point. The seed feeding disc is a conventional component of the existing seed feeding mechanism. Other seed feeding mechanisms that can achieve the same function can also be simply replaced and should also fall within the scope of protection of the present disclosure.

When the seed spoon 3 is overlapped with the position of the corresponding seed suction hole 5 at the picking point, a linear speed of the seed spoon 3 and a linear speed of seeds in motion at a corresponding seed suction hole 5 are consistent with each other to fetch seeds at the same speed at the picking point, so as to prevent the seeds from being hit and sent flying or being damaged by the seed spoon 3.

Figure 2:
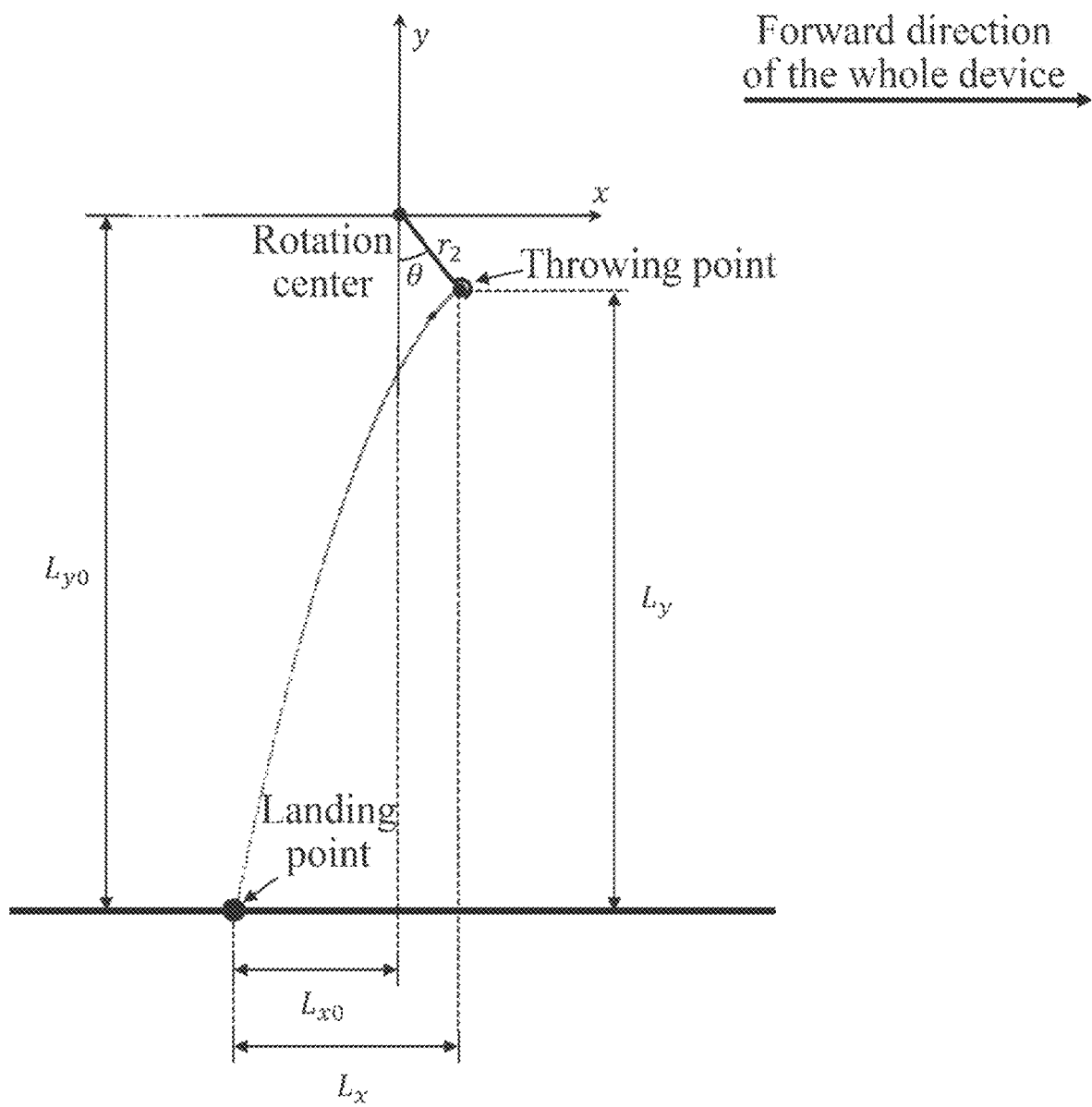
FIG. 2 is a schematic diagram of a throwing process of a seed metering control method according to an embodiment of the present disclosure.

As shown in FIG. 1 and FIG. 2, a high-speed precision seed metering control method through kinetic-energy-type rotating and throwing includes the following steps 1-4.

Step 1: the state of seeds at a throwing point and the speed of a seed spoon at the throwing point are determined.

The linear speed $V_{2p}$ and the throwing angle $\theta$ of the seeds at a moment of being thrown are jointly determined by a horizontal distance $L_x$ and a vertical distance $L_y$ between the throwing point and the landing point, as well as a forward speed $V_t$ of the whole device and a gravity acceleration g, in which the calculation formulas are as follows:

$$V_{2p} = \sqrt{V_{px}^2 + V_{py}^2}$$

$$\theta = \arctan \frac{V_{px}}{V_{px}}$$

where $V_{px}$ and $V_{py}$ are a horizontal component and a vertical component of the throwing speed of the seeds at the throwing point, respectively, $V_{px}$ and $V_t$ have the same size and opposite directions, in which:

$$V_{px} = V_t$$

$$V_{py} = \frac{1}{2}\left(\frac{2L_y}{T_f} - gT_f\right)$$

$$T_f = \frac{L_x}{V_{px}}$$

where $T_f$ is the flight time from throwing to landing of the seeds.

The calculation formula of an angular speed $\omega_{2p}$ of the seed spoon 3 at the throwing point is:

$$\omega_{2p} = \frac{V_{2p}}{r_2}$$

where $r_2$ is the radius for rotation motion of the seed spoon.

Step 2: average angular speeds of a seed feeding disc and the seed spoon during rotation are determined.

The forward speed $V_t$ of the whole device and the seeding plant spacing $L_p$ are given, the calculation formulas of the average angular speed $\omega_{1m}$ of the seed feeding disc 4 and the average angular speed $\omega_{2m}$ of the seed spoon 3 are as follows:

$$\omega_{1m} = \frac{2\pi V_t}{L_p z}$$

$$\omega_{2m} = \frac{2\pi V_t}{L_p}$$

where Z is the number of seed suction holes on the seed feeding disc.

Step 3: the angular speeds of the seed feeding disc and the seed spoon at a picking time are determined.

The linear speed at which the seeds at the picking point move with the seed feeding disc 4 is consistent with the linear speed at which the seed spoon 3 fetches the seeds, and the angular speed $\omega_{2q}$ of the seed spoon 3 at the picking point and the angular speed $\omega_{1q}$ of the seed feeding disc 4 at the picking point are obtained as follows:

$$\omega_{2q} = 2\omega_{2m} - \omega_{2p}$$

$$\omega_{1q} = \frac{\omega_{2q} r_2}{r_1}$$

where $r_1$ is the radius for rotation motion of the seeds with the seed feeding disc.

Step 4: the rotating motion trajectories of the seed feeding disc and the seed spoon are obtained through the angular speeds at various critical moments.

Taking the picking point as reference zero time and zero position, a speed curve $\omega_2(t)$ and a position curve $\theta_2(t)$ at which the seed spoon 3 rotates for a period include an acceleration section and a deceleration section, which are divided into an angular speed curve $\omega_{2a}(t)$ during acceleration process, an angular speed curve $\omega_{2d}(t)$ during deceleration process, a position curve $\theta_{2a}(t)$ during acceleration process and a position curve $\theta_{2d}(t)$ during deceleration process. The calculation formula of each curve trajectory is as follows:

$$\omega_{2a}(t) = \omega_{2m} - (\omega_{2m} - \omega_{2q})\cos\left(\frac{\pi}{T_{2a}}t\right) \; t \in [0, T_{2a})$$

$$\omega_{2d}(t) = \omega_{2m} + (\omega_{2m} - \omega_{2q})\cos\left[\frac{\pi}{T_{2d}}(t - T_{2a})\right] \; t \in [T_{2a}, T_{2s})$$

$$\theta_{2a}(t) = \int_0^t [\omega_{2a}(t)]dt \; t \in [0, T_{2a})$$

$$\theta_{2d}(t) = \int_{T_{2a}}^t [\omega_{2d}(t)]dt + \theta_{2a}(T_{2a}) \; t \in [T_{2a}, T_{2s})$$

where $[0, T_{2a})$ is an acceleration time period, $[T_{2a}, T_{2s})$ is a deceleration time period, $T_{2a}$ is a time spent for the seed spoon to move from the picking point to the throwing point, $$T_{2a} = \frac{\theta_{th}}{\omega_{2m}},$$

$T_{2s}$ is the time spent for the seed spoon to rotate for a period, $$T_{2s} = 2\frac{\pi}{\omega_{2m}},$$

$T_{2d}$ is the time spent for the seed spoon to move from the throwing point to the picking point, $T_{2d} = T_{2s} - T_{2a}$. $\theta_{th}$ is the angle through which the seed spoon rotates from the picking point to the throwing point, and when there is an included angle $\theta_0$ between a line connecting the picking point of the seed spoon 3 and a rotation center of the seed spoon 3 and the horizontal direction, the following formula holds:

$$\theta_{th} = \frac{3\pi}{2} - \theta_0 - \theta.$$

The angle through which the seed feeding disc 4 rotates between the two seed suction holes 5 is one picking period, and the calculation formulas of a speed curve $\omega_1(t)$ and a position curve $\theta_1(t)$ formed by the seed feeding disc 4 rotating for one picking period are as follows:

$$\omega_1(t) = \omega_{1m} + (\omega_{1q} - \omega_{1m})\cos\left(\frac{2\pi}{T_{2s}}t\right) \; t \in [0, T_{2s})$$

$$\theta_1(t) = \int_0^t \omega_1(t)dt \; t \in [0, T_{2s}).$$

As shown in FIG. 2, in the step 1, position compensation can be carried out to allow the landing points of the seeds relative to the rotation center of the seed spoon 3 are the same, and $L_x$ and $L_y$ after position compensation for different throwing points are respectively:

$$L_x = L_{x0} + r_2 \sin\theta$$

$$L_y = L_{y0} - r_2 \cos\theta,$$

where $L_{x0}$ and $L_{y0}$ are the horizontal distance and the vertical distance between the landing point and the rotation center of the seed spoon, respectively.

In addition, a jitter curve $\theta_{2v}(t)$ is superimposed on the deceleration process position curve $\theta_{2d}(t)$ after the time $T_{2a}$ of the throwing point in the step 4, $\theta_{2v}(t)$ is a cosine trajectory in which the position jitter amplitude is A and the angular frequency is $\omega_v$, calculation formulas are as follows:

$$\theta_{2v}(t) = -A + A\cos(\omega_v(t - T_{2a})) \; t \in [T_{2a}, T_{2a} + T_{2v});$$

$$T_{2v} = \frac{2\pi}{\omega_v};$$

so that the seed spoon 3 can be decelerated to a greater extent to ensure that the seeds can be thrown smoothly. In order to ensure that the seeds can be thrown smoothly, it is ensured that $(T_{2a} + T_{2v}) < T_{2s}$, $T_{2v}$ is the time of one period of the cosine trajectory $\theta_{2v}(t)$.

In the above step 4, the trajectories of the speed curve $\omega_2(t)$, the position curve $\theta_2(t)$ and the superimposed jitter curve $\theta_{2v}(t)$ formed by the seed spoon 3 rotating for a period can also be planned using an S-curve, a trapezoid, a triangle or other common methods according to the relevant key point data. Under the premise of ensuring the same effect, it is common knowledge in the field to use other common methods to plan the trajectory to replace the above curves, which should also fall within the scope of protection of the present disclosure. Similarly, the motion trajectory of the jitter curve $\theta_{2v}(t)$ can also be planned using an S-curve, a trapezoid, a triangle or other common methods.

As shown in FIG. 1, cooperative controlling of two motors are used to achieve seed feeding and kinetic-energy-type rotating and throwing seed metering. A seed feeding motor 1 is used to rotate a seed feeding disc 4. The seed feeding disc 4 is cooperated with an air suction device to suck seeds and rotate at a certain speed. A throwing motor 2 is used to rotate a seed spoon 3. When the seed spoon 3 is overlapped with the position of the seed suction hole 5 of the seed feeding disc 4, linear speed of the seed spoon 3 and linear speed of the seed in motion at the seed suction holes 5 are consistent with each other to fetch seeds at the same speed at the picking point, so as to prevent the seeds from flying or being damaged. After fetching seeds at the picking point, the seed spoon 3 is accelerated by the throwing motor 2 to provide initial kinetic energy for the seeds. After rotating to a throwing point, the seed spoon 3 is decelerated by the throwing motor 2 to throw the seeds out. The throwing speed and the throwing angle of the seeds can be precisely controlled by adjusting the position of the throwing point and the rotational speed of the throwing motor 2.

Embodiment 1

The parameters involved in this embodiment are as follows. The forward speed $V_t$ of the whole device is 8.3333 m/s, which is corresponding to the forward speed 30 km/h of the whole device. The radius $r_1$ for rotation motion of the seeds with the seed feeding disc is 0.11 m. The radius $r_2$ for rotation motion of the seed spoon is 0.08 m. The plant spacing $L_p$ is 0.2 m. The number Z of seed suction holes on the seed feeding disc is 3. The gravity acceleration g is taken as 10 m/s². The control step is as follows.

1) The flight distance is compensated. As shown in FIG. 2, when the seeds are thrown at different positions, the flight distance of the seeds at different throwing points is compensated, so that the landing points of the seeds relative to the rotation center of the seed spoon 3 are the same. The horizontal distance and the vertical distance between the landing point and the rotation center of the seed spoon 3 are $L_{x0}$=0.2 m and $L_{y0}$=0.834 m, respectively.

In the specific implementation, there is a cross-coupling phenomenon between the determinations of the speed and the position of the throwing point and the compensation of the flight distance. It is necessary to know the flight distance to determine the angle. At the same time, it is necessary to know the angle to know the flight distance. Therefore, the above results are determined mathematically using pre-fetching, iterating and checking methods. First, the throwing angle θ is pre-fetched to obtain the horizontal distance $L_x$ and the vertical distance $L_y$ of the compensated seed flight. Thereafter, the throwing speed is calculated, and a throwing angle θ is obtained. Finally, the calculated throwing angle θ is compared with the pre-fetched throwing angle θ. If the two angles are not equal to each other, the pre-fetched throwing angle θ is modified according to the error direction. A next round of iteration and checking is carried out until the pre-fetched value is consistent with the checked value.

Prior to iteration, the pre-fetched throwing angle θ is 1.204 rad. The forward speed $V_t$ of the whole device is given as 8.3333 m/s. The horizontal distance $L_x$ and the vertical distance $L_y$ of the compensated seed flight are obtained by the pre-fetched throwing angle, and the throwing speed and the throwing angle needed to complete the seed throwing task at the flight distance are further calculated and obtained according to the flight distances $L_x$ and $L_y$ under the pre-fetched throwing angle. Thereafter, the calculated throwing angle is compared with the pre-fetched throwing angle to determine whether the two angles are consistent with each other or not, which are calculated as follows:

$$L_x = L_{x0} + r_2 \sin\theta = 0.2 + 0.08\ \sin(1.204) = 0.2747\ (m)$$

$$L_y = L_{y0} - r_2 \cos\theta = 0.834 - 0.08\ \cos(1.204) = 0.8053\ (m)$$

$$T_f = \frac{L_x}{V_{px}} = \frac{0.2747}{8.3333} = 0.033\ (s)$$

$$V_{py} = \frac{1}{2}\left(\frac{2L_y}{T_f} - gT_f\right) = \frac{1}{2}\left(\frac{2 \times 0.8053}{0.033} - 10 \times 0.033\right) = 24.238\ (m/s)$$

$$\theta = \arctan\frac{V_{py}}{V_{px}} = \arctan\frac{24.238}{8.3333} = 1.2396\ (rad).$$

It can be known through calculation that the pre-fetched throwing angle θ is smaller than the calculated throwing angle, thus the pre-fetched throwing angle θ need to be increased. After several rounds of iteration, the throwing angle θ should be 1.2399 rad. At this time, the pre-fetched throwing angle is consistent with the calculated throwing angle, and the pre-fetching iteration ends. The horizontal distance $L_x$ and the vertical distance $L_y$ of the compensated seed flight, and the linear speed $V_{2p}$ of the seeds at the moment of being thrown and the angular speed $\omega_{2p}$ of the seed at the throwing point are obtained from the throwing angle as follows:

$$L_x = L_{x0} + r_2\cos\theta = 0.2 + 0.08\ \sin(1.2399) = 0.27569\ (m)$$

$$L_y = L_{y0} - r_2\sin\theta = 0.834 - 0.08\ \cos(1.2399) = 0.80809\ (m)$$

$$T_f = \frac{L_x}{V_{px}} = \frac{0.27569}{8.3333} = 0.0331\ (s)$$

$$V_{py} = \frac{1}{2}\left(\frac{2L_y}{T_f} - gT_f\right) = \frac{1}{2}\left(\frac{2 \times 0.80809}{0.0331} - 10 \times 0.0331\right) = 24.2611\ (m/s)$$

$$V_{2p} = \sqrt{V_{px}^2 + V_{py}^2} = \sqrt{8.3333^2 + 24.2611^2} = 25.6524\ (m/s).$$

The horizontal distance $L_x$ and the vertical distance $L_y$ of the compensated seed flight, and the linear speed $V_{2p}$ of the seeds at the moment of being thrown and the angular speed $\omega_{2p}$ of seeds at the throwing point are obtained from the throwing angle, which are 0.27569 m, 0.80809 m, 25.6524 m/s and 320.6544 rad/s, respectively.

2) The average angular speed $\omega_{1m}$ of the seed feeding disc 4 and the average angular speed $\omega_{2m}$ of the seed spoon 3 are calculated as follows:

$$\omega_{1m} = \frac{2\pi V_t}{L_p Z} = \frac{2\pi \times 8.3333}{0.2 \times 3} = 87.2665\ (rad/s)$$

$$\omega_{2m} = \frac{2\pi V_t}{L_p} = \frac{2\pi \times 8.3333}{0.2} = 261.7994\ (rad/s).$$

So the average angular speed $\omega_{1m}$ of the seed feeding disc 4 is 87.2665 rad/s, and the average angular speed $\omega_{2m}$ of the seed spoon 3 is 261.7994 rad/s.

3) The linear speed of the seeds at the picking point moving with the seed feeding disc 4 is consistent with the linear speed of the seed spoon 3 taking the seeds, and the angular speed $\omega_{2q}$ of the picking point of the seed spoon 3 and the angular speed $\omega_{1q}$ of the picking point of the seed feeding disc 4 are calculated as follows:

$$\omega_{2q} = 2\omega_{2m} - \omega_{2p} = 2 \times 261.7994 - 320.6544 = 202.9444\ (rad/s)$$

$$\omega_{1q} = \frac{\omega_{2q} r_2}{r_1} = \frac{202.9444 \times 0.08}{0.11} = 147.5959\ (rad/s).$$

So the angular speed $\omega_{2q}$ of the picking point of the seed spoon 3 is 202.9444 rad/s, and the angular speed $\omega_{1q}$ of the picking point of the seed feeding disc 4 is 147.5959 rad/s.

Figure 3:
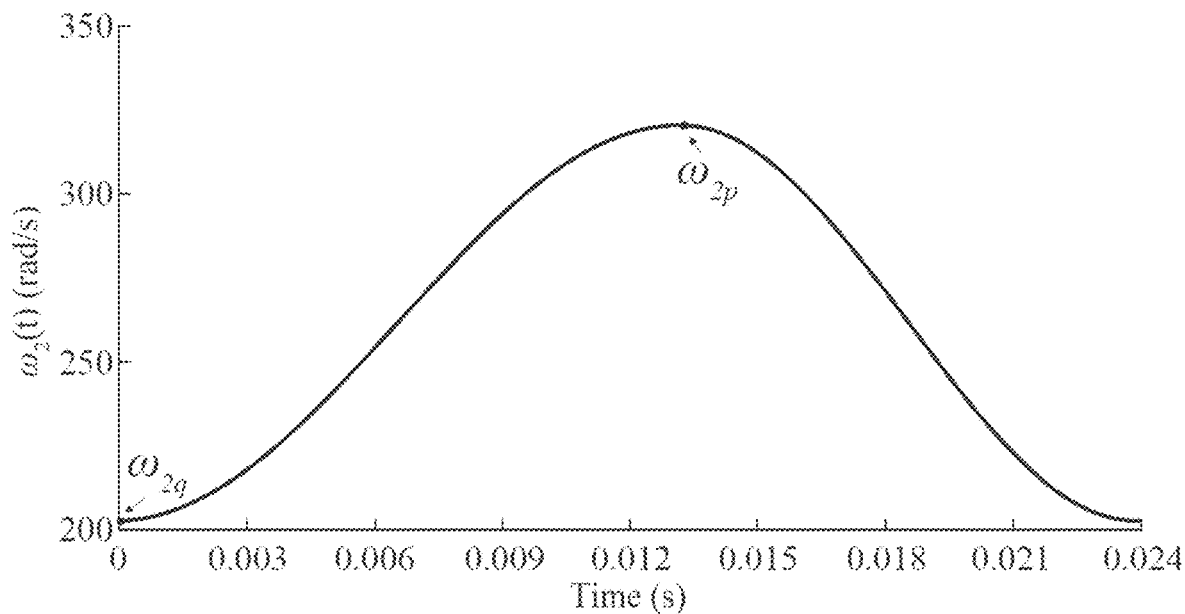
FIG. 3 is a graph of a speed trajectory curve $\omega_2(t)$ of a seed spoon rotating for a period in a seed metering process according to Embodiment 1.
Figure 4:
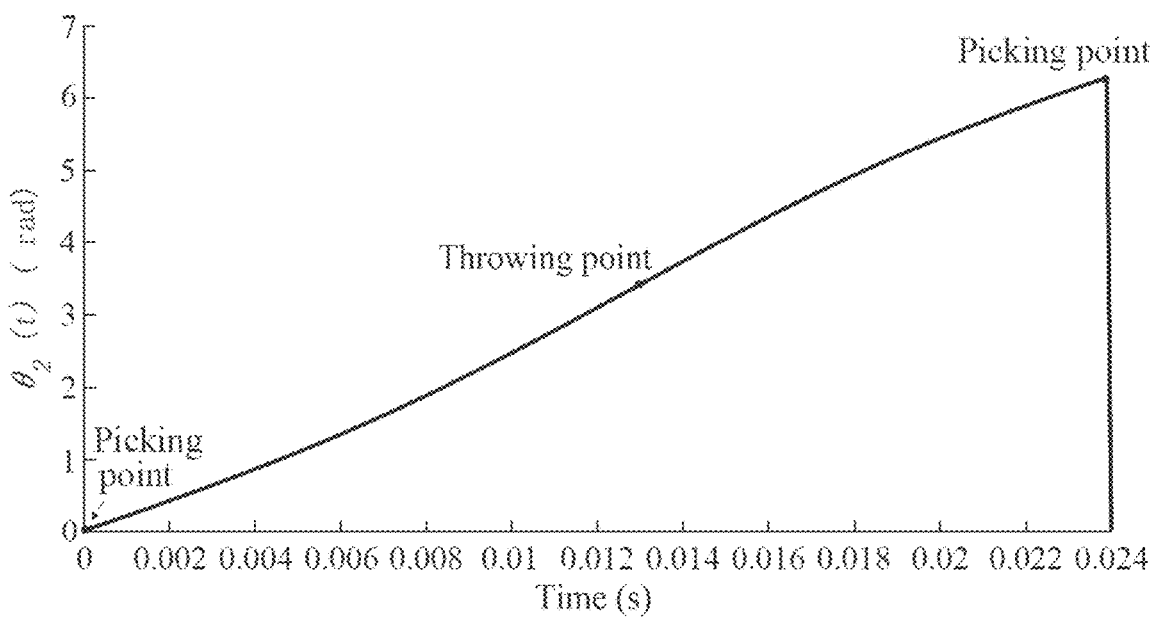
FIG. 4 is a graph of a position trajectory curve $\theta_2(t)$ of a seed spoon rotating for a period in a seed metering process according to Embodiment 1.

4) Taking the picking point as reference time zero and position zero, the speed curve $\omega_2(t)$ at which the seed spoon 3 rotates for a period is shown with reference to FIG. 3, and the position curve $\theta_2(t)$ is shown with reference to FIG. 4. The time $T_2$, at which the seed spoon rotates for a period is calculated as follows:

$$T_{2s} = \frac{2\pi}{\omega_{2m}} = \frac{2\pi}{261.7994} = 0.024 \text{ (s)}.$$

So the time $T_{2s}$ at which the seed spoon rotates for a period is 0.024 s.

Figure 5:
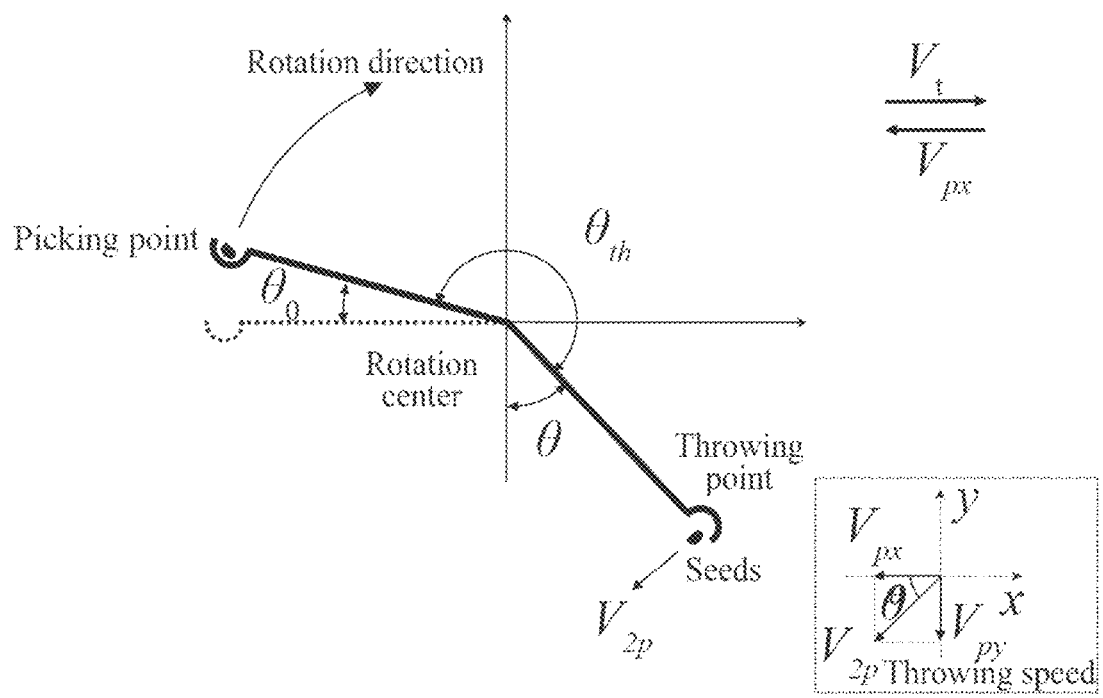
FIG. 5 is a schematic diagram of an angle involved in a seed metering process according to the embodiment.

In this embodiment, as shown in FIG. 5, when the clockwise included angle $\theta_0$ between a line connecting the picking point of the seed spoon 3 and a rotation center of the seed spoon 3 and the horizontal direction is 0, the seed spoon 3 rotates clockwise, and the seed throwing angle is 0, the following formula holds:

$$\theta_{th} = \frac{3\pi}{2} - \theta_0 - \theta = 3.4725 \text{ (rad)}.$$

The $T_{2a}$ of the seed spoon is calculated as follows:

$$T_{2a} = \frac{\theta_{th}}{\omega_{2m}} = \frac{3.4725}{261.7994} = 0.0133 \text{ (s)}.$$

So the $T_{2a}$ of the seed spoon is 0.0133 s.

Therefore, each curve trajectory is calculated as follows:

$\omega_{2a}(t)=261.7994-58.855\cos(236.8548t)$ $t\in[0,0.0133)$ $\omega_{2d}(t)=261.7994+58.855\cos[292.6166(t-0.0133)]$ $t\in[0.0133,0.024)$ $\theta_{2a}(t)=261.7994t-0.248\sin(236.8548t)$ $t\in[0,0.0133)$ $\omega_{2d}(t)=261.7994(t-0.013)+0.2011\sin[292.6166(t-0.013)]+\theta_{2a}(T_{2a})$ $t\in[0.013,0.024)$.

Figure 6:
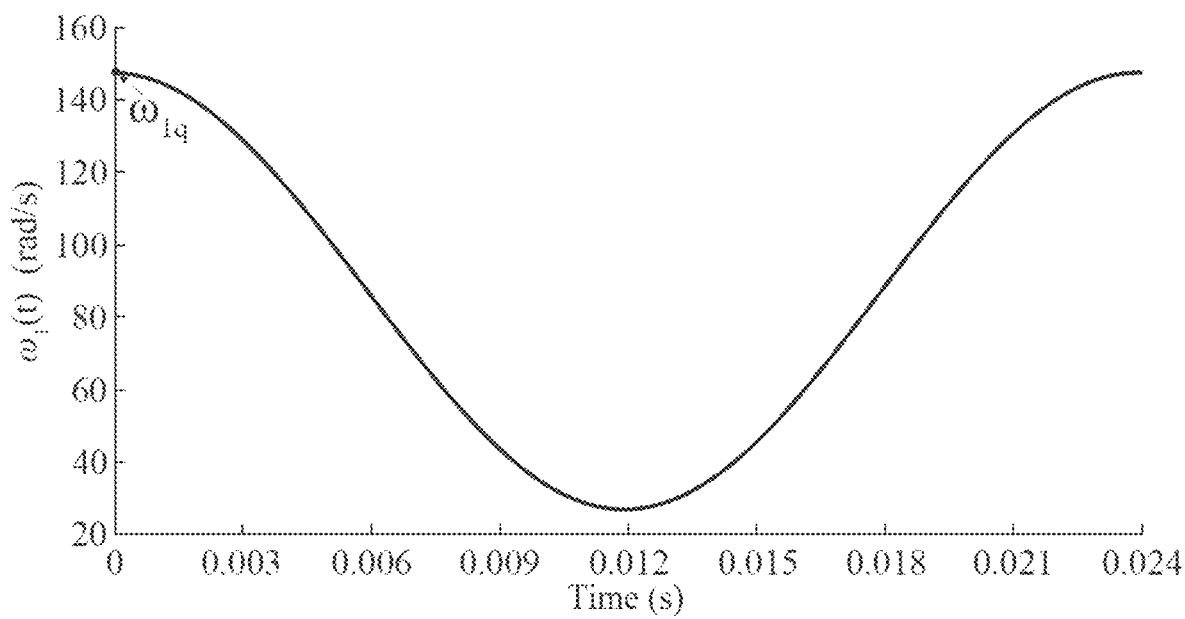
FIG. 6 is a graph of a speed trajectory curve $\omega_1(t)$ of a seed feeding disc rotating for a period in a seed metering process according to Embodiment 1.
Figure 7:
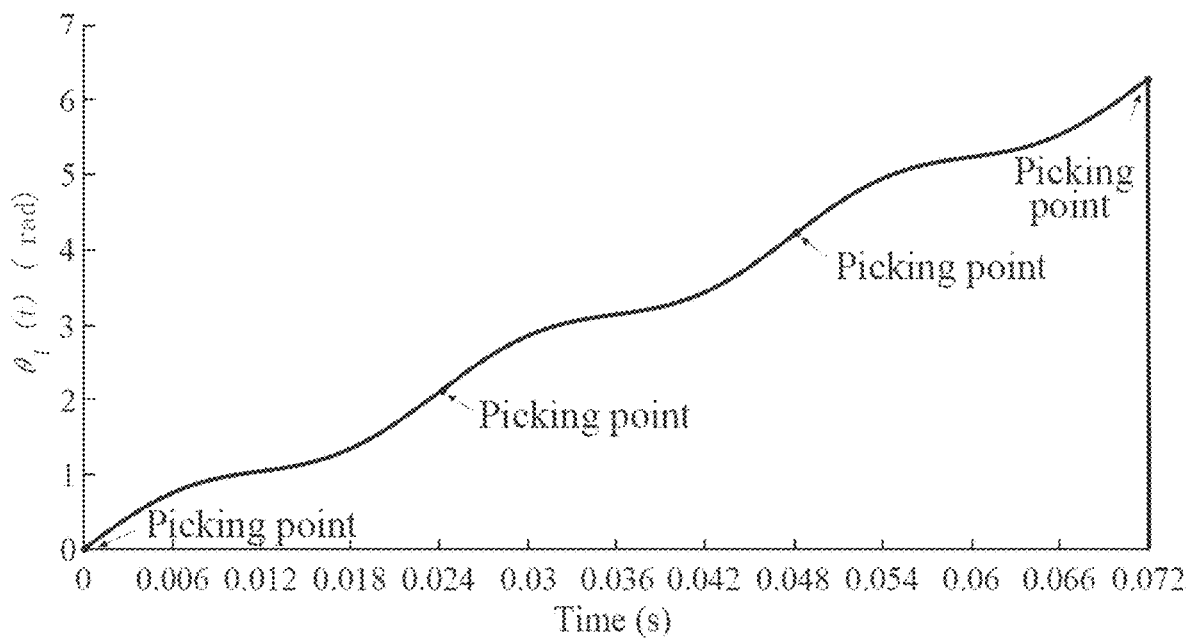
FIG. 7 is a graph of a position trajectory curve $\theta_1(t)$ of a seed feeding disc rotating through one round according to Embodiment 1.

As shown in FIG. 6 and FIG. 7, the speed curve $\omega_1(t)$ and the position curve $\theta_1(t)$ of the seed feeding disc 4 rotating for a seed taking period are as follows:

$\omega_1(t)=87.2665+60.3294\cos(261.799t)$ $t\in[0,0.024)$ $\omega_1(t)=87.2665t+0.23\sin(261.799t)$ $t\in[0,0.024)$.

Figure 8:
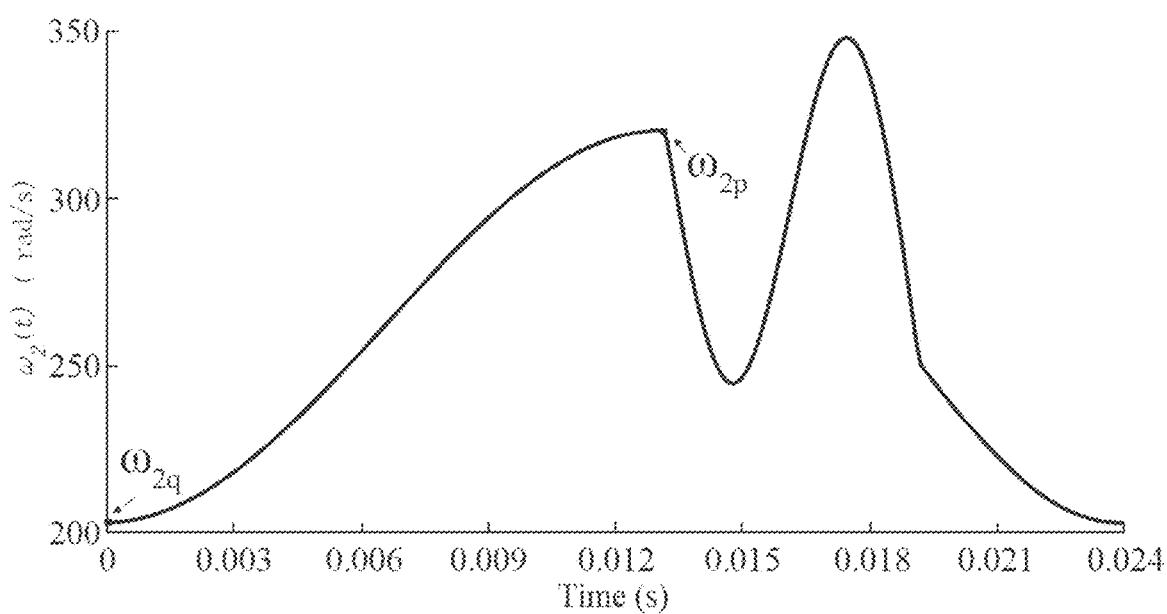
FIG. 8 is a graph of a speed trajectory curve $\omega_2(t)$ of a seed spoon rotating for a period after a jitter curve is superimposed according to Embodiment 1.
Figure 9:
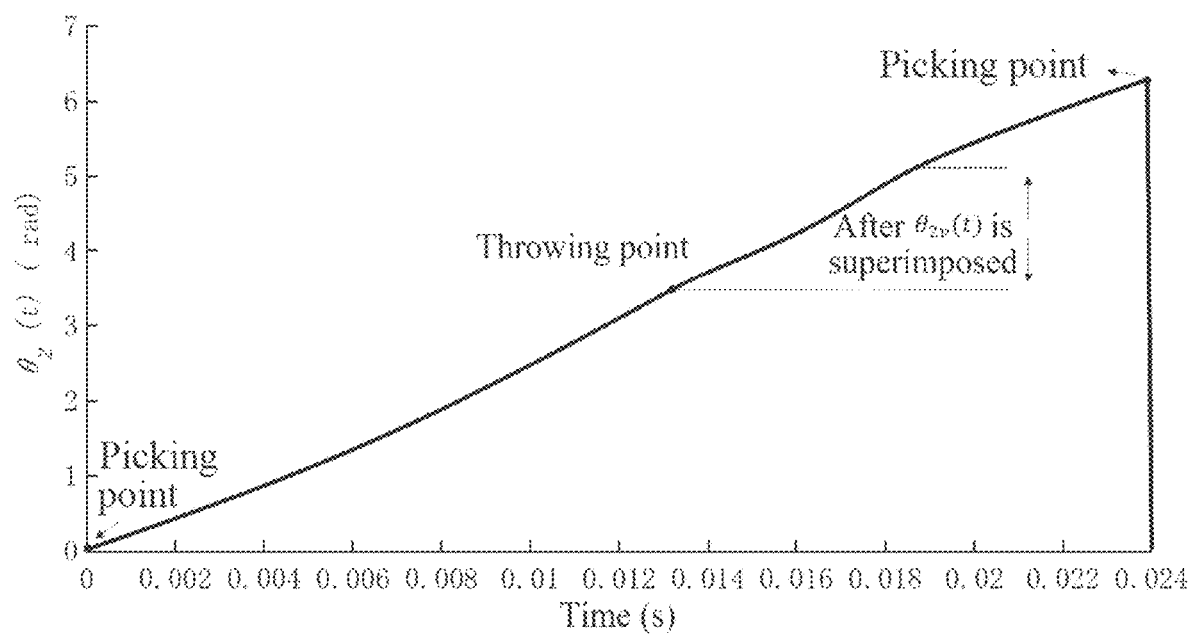
FIG. 9 is a graph of a position trajectory curve $\theta_2(t)$ of a seed spoon rotating for a period after a jitter curve is superimposed according to Embodiment 1.

In addition, as shown in FIG. 8 and FIG. 9, a jitter curve $\theta_{2v}(t)$ is superimposed on the deceleration process position curve $\theta_{2d}(t)$ after the throwing point time $T_{2a}$. $\theta_{2v}(t)$ is a cosine trajectory in which the position jitter amplitude is A=0.0668 and the angular frequency is $$\omega_v = \frac{8\pi}{T_{2s}},$$

so that the seed spoon 3 is decelerated to a greater extent to ensure that the seeds can be thrown smoothly. The formulas are as follows:

$$\theta_{2v}(t) = -0.0668 + 0.0668\cos(1047.19(t-0.0133))\ t\in[0.0133, 0.0193)$$

$$T_{2v} = \frac{2\pi}{\omega_v} = \frac{T_{2s}}{4} = 0.006.$$

Figure 10:
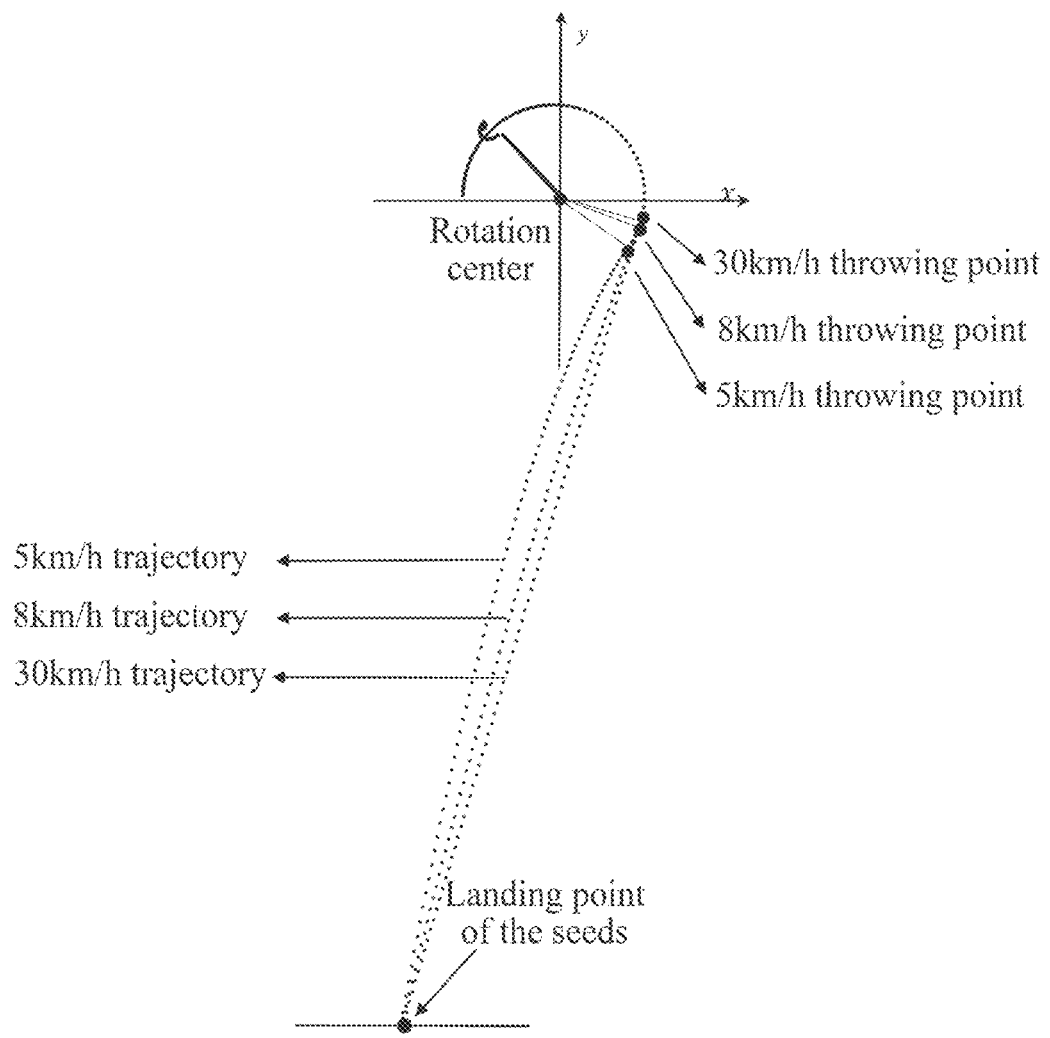
FIG. 10 is a schematic diagram of different flight trajectories of seeds from throwing to landing at different forward speeds according to the embodiment.

Finally, as shown in FIG. 10, the curve corresponding to "30 km/h" gives the motion trajectory of the seeds in the process of performing rotation motion with the seed spoon 3 after taking seeds and in the process of flying and landing after throwing in this embodiment.

Embodiment 2

The parameters involved in this embodiment are as follows. The forward speed $V_t$ of the whole device is 2.22 m/s, which is corresponding to the forward speed 8 km/h of the whole device. The radius $r_1$ for rotation motion of the seeds with the seed feeding disc is 0.11 m. The radius $r_2$ for rotation motion of the seed spoon is 0.08 m. The plant spacing $L_p$ is 0.2 m. The number Z of seed suction holes on the seed feeding disc is 3. The gravity acceleration g is taken as 10 m/s². The control step is as follows.

1) The flight distance is compensated. As shown in FIG. 2, when the seeds are thrown at different positions, the flight distance of the seeds at different throwing points is compensated, so that the landing points of the seeds relative to the rotation center of the seed spoon 3 are the same. The horizontal distance and the vertical distance between the landing point and the rotation center of the seed spoon 3 are $L_{x0}$=0.2 m and $L_{y0}$=0.834 m, respectively.

In the specific implementation, there is a cross-coupling phenomenon between the determinations of the speed and the position of the throwing point and the compensation of the flight distance. It is necessary to know the flight distance to determine the angle. At the same time, it is necessary to know the angle to know the flight distance. Therefore, the above results are determined mathematically using pre-fetching, iterating and checking methods. First, the throwing angle $\theta$ is pre-fetched to obtain the horizontal distance $L_x$ and the vertical distance $L_y$ of the compensated seed flight. Thereafter, the throwing speed is calculated, and a throwing angle $\theta$ is obtained. Finally, the calculated throwing angle $\theta$ is compared with the pre-fetched throwing angle $\theta$. If the two angles are not equal to each other, the pre-fetched throwing angle $\theta$ is modified according to the error direction. A next round of iteration and checking is carried out until the pre-fetched value is consistent with the checked value.

Prior to iteration, the pre-fetched throwing angle $\theta$ is 0.785 rad. The forward speed $V_t$ of the whole device is given as 2.22 m/s. The horizontal distance $L_x$ and the vertical distance $L_y$ of the compensated seed flight are obtained by the pre-fetched throwing angle, and the throwing speed and the throwing angle needed to complete the seed throwing task at the flight distance are further calculated and obtained according to the flight distances $L_x$ and $L_y$ under the pre-fetched throwing angle. Thereafter, the calculated throwing angle is compared with the pre-fetched throwing angle to determine whether the two angles are consistent with each other or not, which are calculated as follows:

$$L_x = L_{x0} + r_2\sin\theta = 0.2 + 0.08\sin(0.785) = 0.2565 \text{ (m)}$$

$$L_y = L_{y0} - r_2\cos\theta = 0.834 - 0.08\cos(0.785) = 0.7774 \text{ (m)}$$

$$T_f = \frac{L_x}{V_{px}} = \frac{0.2565}{2.22} = 0.1155 \text{ (s)}$$

$$V_{py} = \frac{1}{2}\left(\frac{2L_y}{T_f} - gT_f\right) = \frac{1}{2}\left(\frac{2\times 0.7774}{0.1155} - 10\times 0.1155\right) = 6.1532 \text{ (m/s)}$$

$$\theta = \arctan\frac{V_{py}}{V_{px}} = \arctan\frac{6.1532}{2.22} = 1.2245 \text{ (rad)}.$$

It can be known through calculation that the pre-fetched throwing angle θ is smaller than the calculated throwing angle, thus the pre-fetched throwing angle θ need to be increased. After several rounds of iteration, the throwing angle θ should be 1.2104 rad. At this time, the pre-fetched throwing angle is consistent with the calculated throwing angle, and the pre-fetching iteration ends. The horizontal distance $L_x$ and the vertical distance $L_y$ of the compensated seed flight, and the linear speed $V_{2p}$ of the seeds at the moment of being thrown and the angular speed $\omega_{2p}$ of the seeds at the throwing point are obtained from the throwing angle as follows:

$$L_x = L_{x0} + r_2\sin\theta = 0.2 + 0.08\sin(1.2104) = 0.27489 \text{ (m)}$$

$$L_y = L_{y0} - r_2\cos\theta = 0.834 - 0.08\cos(1.2104) = 0.8058 \text{ (m)}$$

$$T_f = \frac{L_X}{V_{px}} = \frac{0.27489}{2.22} = 0.1237 \text{ (s)}$$

$$V_{py} = \frac{1}{2}\left(\frac{2L_y}{T_f} - gT_f\right) = \frac{1}{2}\left(\frac{2\times 0.8058}{0.1237} - 10\times 0.1237\right) = 5.8962 \text{ (m/s)}$$

$$V_{2p} = \sqrt{V_{px}^2 + V_{py}^2} = \sqrt{2.22^2 + 5.8962^2} = 6.3010 \text{ (m/s)}$$

$$\omega_{2p} = \frac{V_{2p}}{r_2} = \frac{6.3010}{0.08} = 78.7629 \text{ (rad/s)}.$$

The horizontal distance $L_x$ and the vertical distance $L_y$ of the compensated seed flight, and the linear speed $V_{2p}$ of the seeds at the moment of being thrown and the angular speed $\omega_{2p}$ of the seeds at the throwing point are obtained from the throwing angle, which are 0.27489 m, 0.80586 m, 6.3010 m/s and 78.7629 rad/s, respectively.

2) The average angular speed $\omega_{1m}$ of the seed feeding disc 4 and the average angular speed $\omega_{2m}$ of the seed spoon 3 are calculated as follows:

$$\omega_{1m} = \frac{2\pi V_t}{L_p Z} = \frac{2\pi \times 2.22}{0.2 \times 3} = 23.2711 \text{ (rad/s)}$$

$$\omega_{2m} = \frac{2\pi V_t}{L_p} = \frac{2\pi \times 2.22}{0.2} = 69.8132 \text{ (rad/s)}.$$

So the average angular speed $\omega_{1m}$ of the seed feeding disc 4 is 23.2711 rad/s, and the average angular speed $\omega_{2m}$ of the seed spoon 3 is 69.8132 rad/s.

3) The linear speed of the seeds at the picking point moving with the seed feeding disc 4 is consistent with the linear speed of the seed spoon 3 taking the seeds, and the angular speed $\omega_{2q}$ of the picking point of the seed spoon 3 and the angular speed $\omega_{1q}$ of the picking point of the seed feeding disc 4 are calculated as follows:

$$\omega_{2q} = 2\omega_{2m} - \omega_{2p} = 2\times 69.8132 - 78.7629 = 60.8634 \text{ (rad/s)}$$

$$\omega_{1q} = \frac{\omega_{2q}r_2}{r_1} = \frac{60.8634 \times 0.08}{0.11} = 44.2643 \text{ (rad/s)}.$$

So the angular speed $\omega_{2q}$ of the picking point of the seed spoon 3 is 60.8634 rad/s, and the angular speed $\omega_{1q}$ of the picking point of the seed feeding disc 4 is 44.2634 rad/s.

Figure 11:
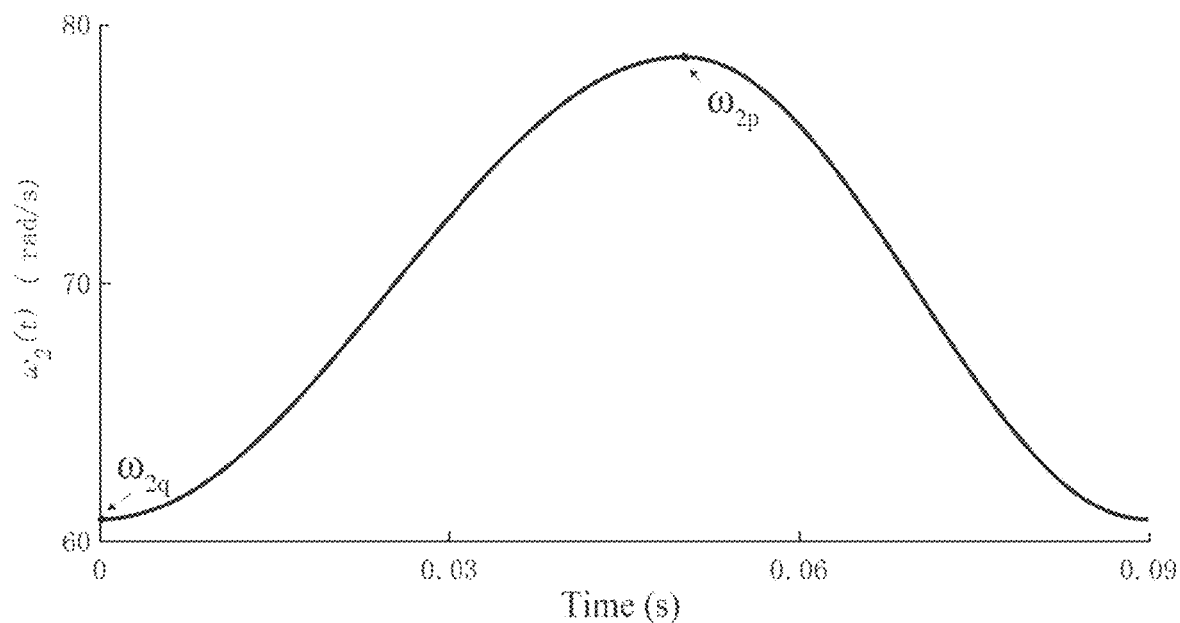
FIG. 11 is a graph of a speed trajectory curve $\omega_2(t)$ of a seed spoon rotating for a period in a seed metering process according to Embodiment 2.
Figure 12:
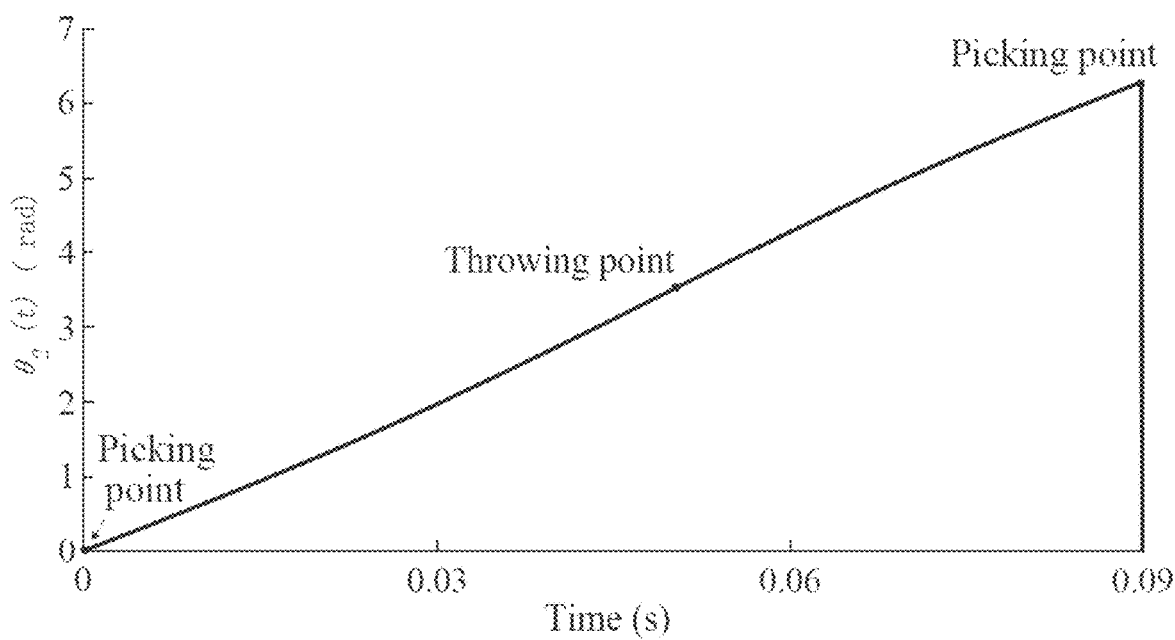
FIG. 12 is a graph of a position trajectory curve $\theta_2(t)$ of a seed spoon rotating for a period in a seed metering process according to Embodiment 2.

4) Taking the picking point as reference time zero and position zero, the speed curve $\omega_2(t)$ at which the seed spoon 3 rotates for a period is shown with reference to FIG. 11, and the position curve $\theta_2(t)$ is shown with reference to FIG. 12. The time $T_{2s}$ at which the seed spoon rotates for a period is calculated as follows:

$$T_{2s} = \frac{2\pi}{\omega_{2m}} = \frac{2\pi}{69.8132} = 0.09 \text{ (s)}.$$

So the time $T_{2s}$ at which the seed spoon rotates for a period is 0.09 s.

In this embodiment, as shown in FIG. 5, when the clockwise included angle $\theta_0$ between the line connecting the picking point of the seed spoon 3 and a rotation center of the seed spoon 3 and the horizontal direction is 0, the seed spoon 3 rotates clockwise, and the seed throwing angle is 0, the following formula holds:

$$\theta_{th} = \frac{3\pi}{2} - \theta_0 - \theta = \frac{3\pi}{2} - 1.2104 = 3.502 \text{ (rad)}.$$

The $T_{2a}$ of the seed spoon is calculated as follows:

$$T_{2a} = \frac{\theta_{th}}{\omega_{2m}} = \frac{3.502}{69.8132} = 0.0502(s).$$

So the $T_{2a}$ of the seed spoon is 0.0502 s.
Therefore, each curve trajectory is calculated as follows:

$$\omega_{2a}(t)=69.8132-8.9498\cos(62.6280t) \ t\in[0,0.0502)$$

$$\omega_{2a}(t)=69.8132+8.9498\cos[78.8607(t-0.0502)]$$
$$t\in[0.0502,0.09)$$

$$\theta_{2a}(t)=69.8132t-0.1429\sin(62.6280t) \ t\in[0,0.0502)$$

$$\theta_{2a}(t)=69.8132(t-0.0502)+0.1134\sin[78.8607(t-0.0502)]+\theta_{2a}(T_{2a}) \ t\in[0.0502,0.09)$$

Figure 13:
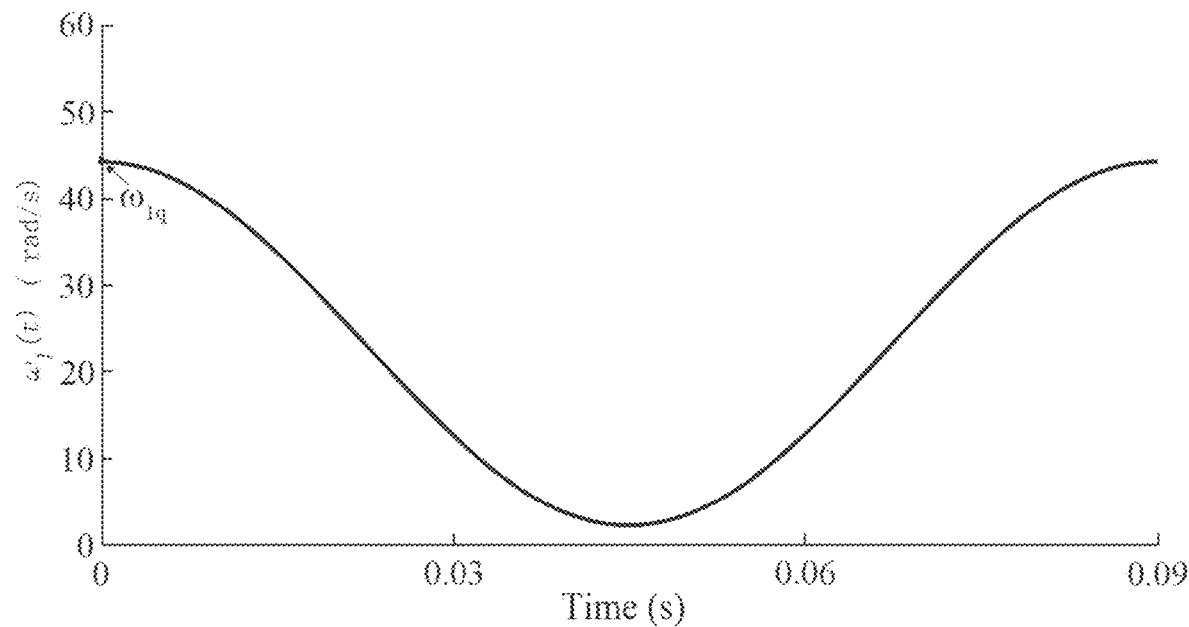
FIG. 13 is a graph of a speed trajectory curve $\omega_1(t)$ of a seed feeding disc rotating for a period in a seed metering process according to Embodiment 2.
Figure 14:
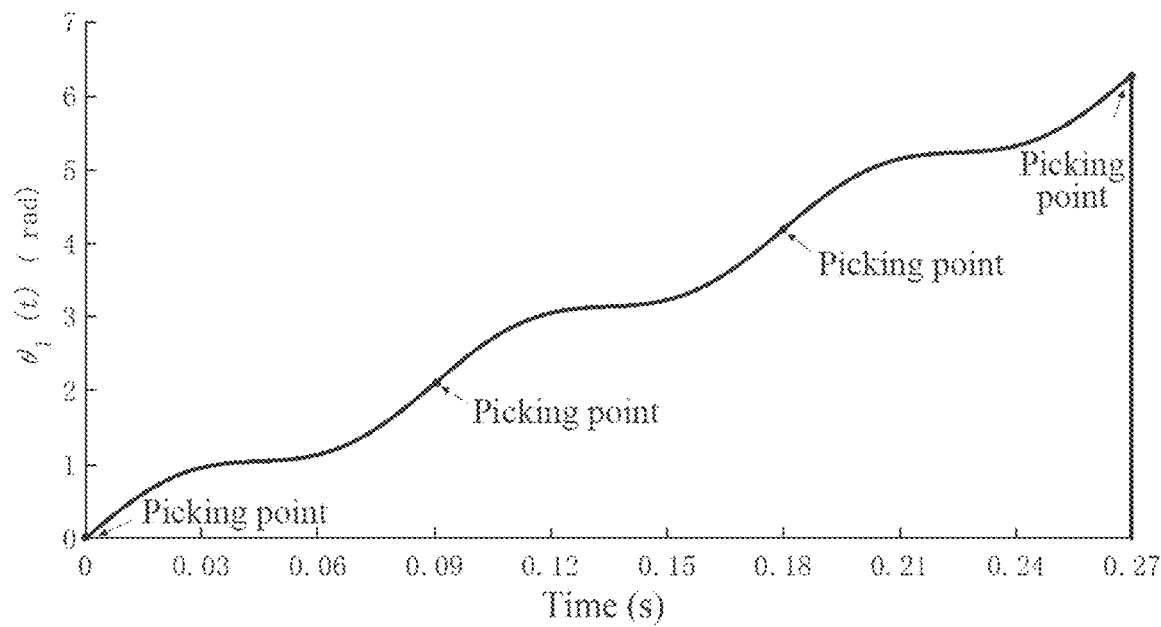
FIG. 14 is a graph of a position trajectory curve $\theta_1(t)$ of a seed feeding disc rotating through one turn according to Embodiment 2.

As shown in FIG. 13 and FIG. 14, the speed curve $\omega_1(t)$ and the position curve $\theta_1(t)$ of the seed feeding disc 4 rotating for a seed taking period are as follows:

$$\omega_1(t)=23.2711+20.9752\cos(69.813t) \ t\in[0,0.09)$$

$$\theta_1(t)=23.2711t+0.3007\sin(69.813t) \ t\in[0,0.09).$$

Figure 15:
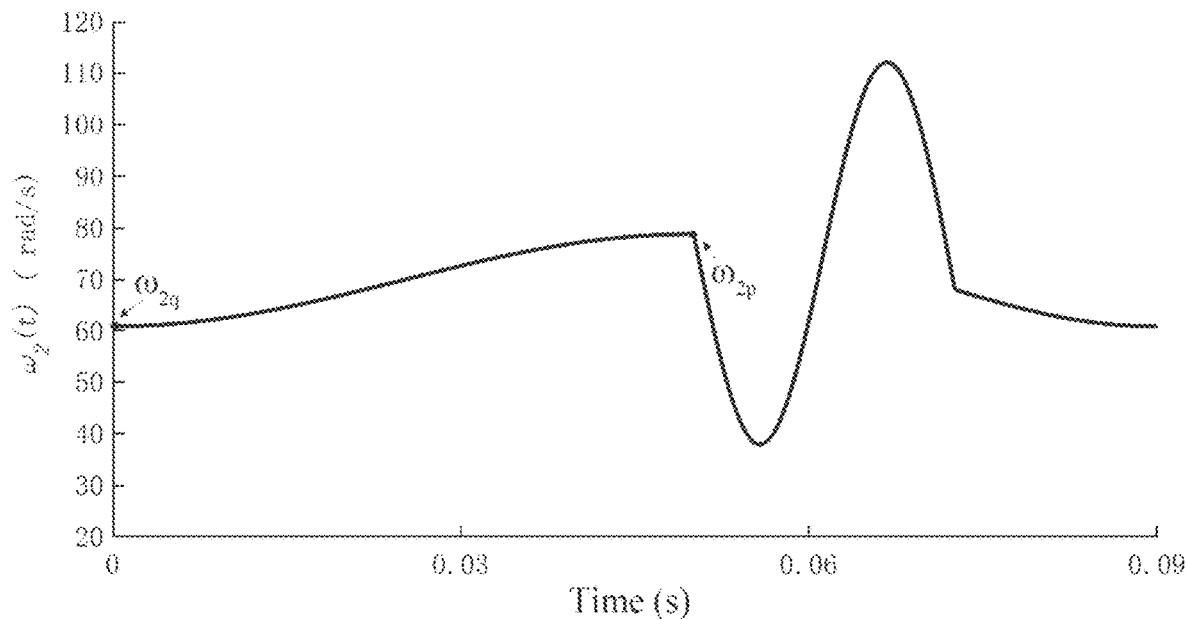
FIG. 15 is a graph of a speed trajectory curve $\omega_2(t)$ of a seed spoon rotating for a period after a jitter curve is superimposed according to Embodiment 2.
Figure 16:
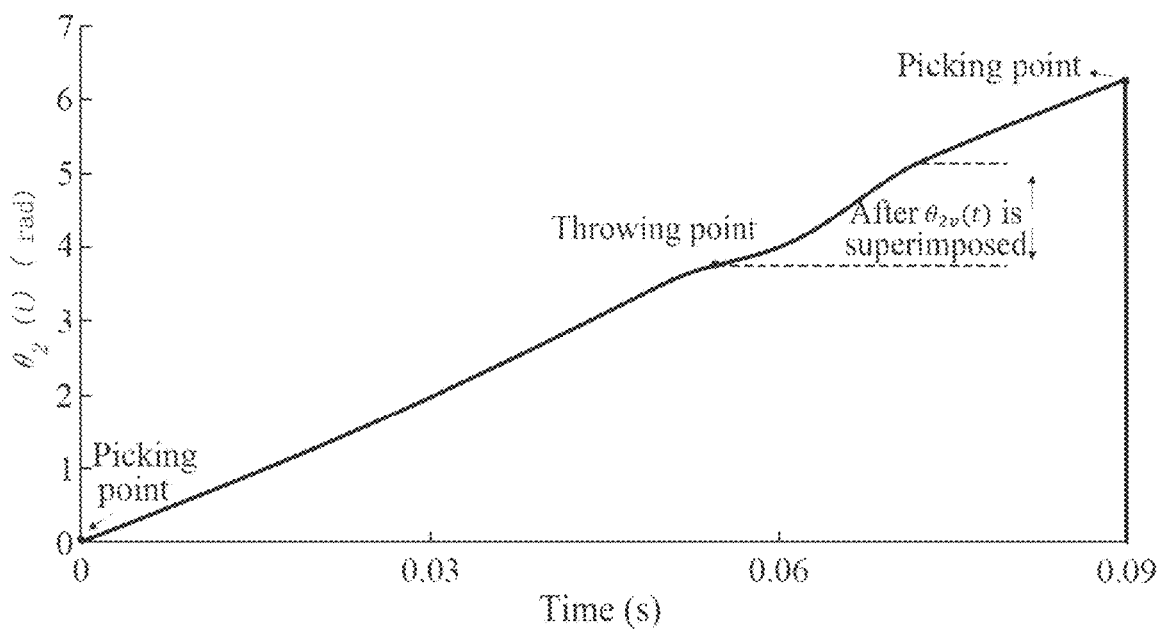
FIG. 16 is a graph of a position trajectory curve $\theta_2(t)$ of a seed spoon rotating for a period after a jitter curve is superimposed according to Embodiment 2.

In addition, as shown in FIG. 15 and FIG. 16, a jitter curve $\theta_{2v}(t)$ is superimposed on the deceleration process position curve $\theta_{2a}(t)$ after the throwing point time $T_{2a}$. $\theta_{2v}(t)$ is a cosine trajectory in which the position jitter amplitude is A=0.1432 and the angular frequency is $$\omega_v = \frac{8\pi}{T_{2s}},$$

so that the seed spoon 3 is decelerated to a greater extent to ensure that the seeds can be thrown smoothly. The formulas are as follows:

$$\theta_{2v}(t) = -0.1432 + 0.1432\cos(279.25(t - 0.0502))t \in [0.0502, 0.0727)$$

$$T_{2v} = \frac{2\pi}{\omega_v} = \frac{T_{2s}}{4} = 0.0225(s).$$

Finally, as shown in FIG. 10, the curve corresponding to "8 km/h" gives the motion trajectory of the seeds in the process of performing rotation motion with the seed spoon 3 after taking seeds and in the process of flying and landing after throwing in this embodiment.

Embodiment 3

Figure 17:
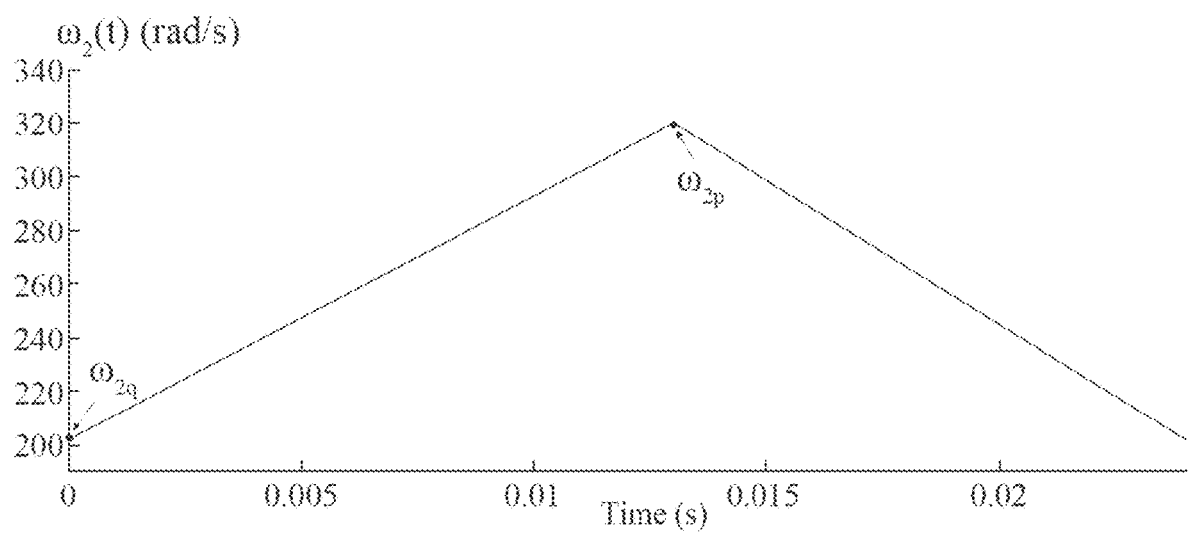
FIG. 17 is a graph of a speed trajectory curve $\omega_2(t)$ of a seed spoon rotating for a period in a seed metering process according to Embodiment 3.
Figure 18:
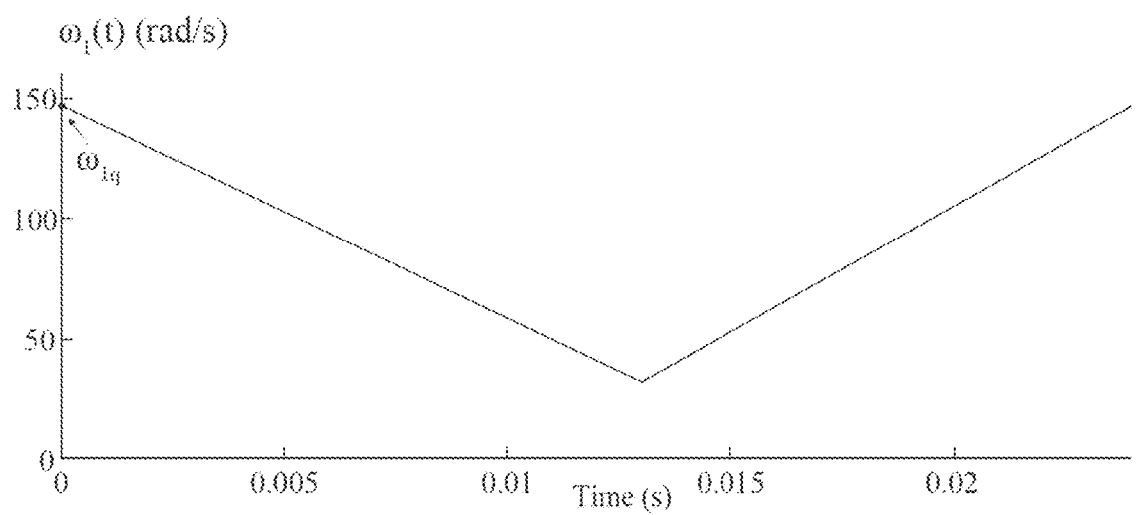
FIG. 18 is a graph of a speed trajectory curve $\omega_1(t)$ of a seed feeding disc rotating for a period in a seed metering process according to Embodiment 3.
Figure 19:
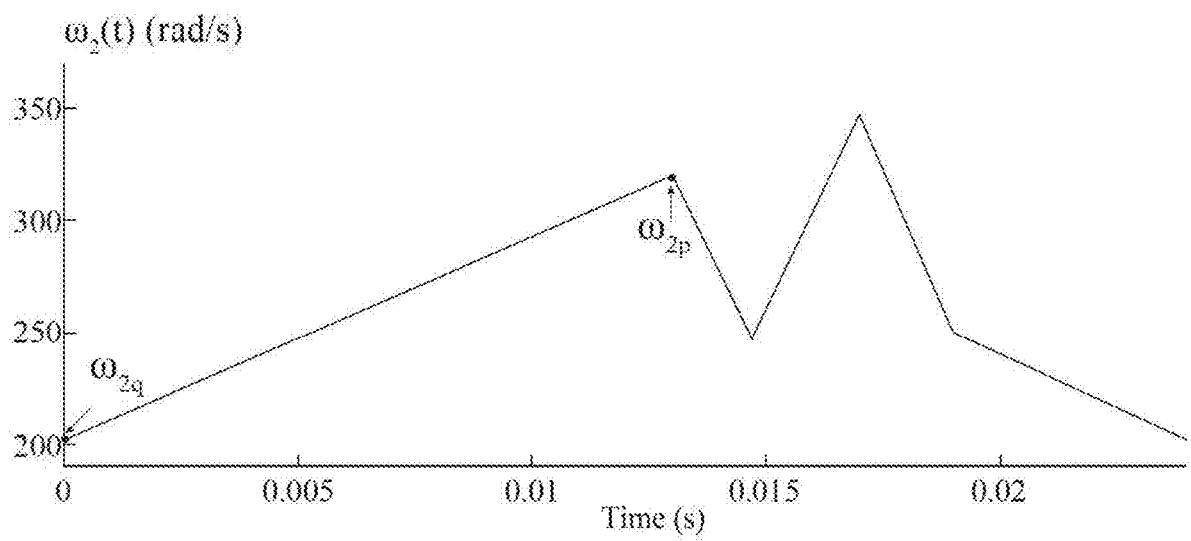
FIG. 19 is a graph of a speed trajectory curve $\omega_2(t)$ of a seed spoon rotating for a period after a jitter curve is superimposed according to Embodiment 3.

The parameters involved in this embodiment and the key point data related to the motion trajectory are taken from Embodiment 1, and the trajectory is planned using triangular curves. The speed trajectory curve $\omega_2(t)$ of the seed spoon 3 rotating for a period is shown with reference to FIG. 17. The speed trajectory curve $\omega_1(t)$ of the seed feeding disc 4 rotating for a period is shown with reference to FIG. 18. The speed trajectory curve $\omega_2(t)$ of the seed spoon 3 rotating for a period after a jitter curve is superimposed is shown with reference to FIG. 19.

To sum up, the present disclosure can support the seeder to achieve high-speed precision seeding up to 30 km/h. The seeds of different sizes can have the same throwing angle and the same throwing speed through the seeding control method, so as to ensure the consistent flight trajectory of the seeds, achieve accurate landing point control, and achieve the effect of zero-speed seed throwing at different traveling speeds to ensure uniform plant spacing.

The present disclosure provides a high-speed precision seed metering device through kinetic-energy-type rotating and throwing and a control method thereof. Specifically, the high-speed precision seed metering device through rotating and throwing and the seed metering control method thereof provided by this embodiment can be applied to seeding scenes. The control method calculates the key data such as the position of the throwing point, the speed of the throwing motor, the rotational speed of the seed feeding motor at the picking point, and the rotational speed of the throwing motor according to the input parameters such as the hardware size and hole spacing of the seed metering device, as well as the seeding plant spacing, the seed flight distance and the speed required by the size of the whole device, generates the motion trajectory of the motor according to the key data, and controls the motor to rotate in real time according to the required trajectory in the seeding process, thus completing the high-speed precision seed metering function.

It is obvious to those skilled in the art that the present disclosure is not limited to the details of the above exemplary embodiments, and the present disclosure can be achieved in other overall forms without departing from the spirit or basic characteristics of the present disclosure. Therefore, the embodiments should be considered in all aspects as exemplary and non-limiting. The scope of the present disclosure is defined by the appended claims rather than the above description. Therefore, all changes that fall within the meaning and the range of equivalents of the claims are intended to be embraced in the present disclosure. Any reference signs in the claims shall not be construed as limiting the claims concerned.

In addition, it should be understood that although the specification is described in terms of embodiments, not every embodiment only contains an independent technical scheme, and the description of the specification is only for the sake of clarity. Those skilled in the art should take the specification as a whole, and the technical schemes in various embodiments can also be appropriately combined to form other embodiments that can be understood by those skilled in the art

What is claimed is:

1. A seed metering device through rotating and throwing, comprising a seed feeding mechanism, a throwing motor and a seed spoon;
    the seed feeding mechanism feeds seeds to a picking point, the throwing motor has an output shaft vertically connected and fixed with a tail of the seed spoon and is configured to drive the seed spoon to circularly rotate, and a head of the seed spoon fetches seeds at the picking point;
    a minimum angular speed of the seed spoon during each period is greater than zero and each period is divided into an acceleration section and a deceleration section; after fetching seeds, the seed spoon is accelerated by the throwing motor to provide initial kinetic energy for the seeds; after rotating to a throwing point, the seed spoon is decelerated by the throwing motor to throw the seeds out, and a throwing speed and a throwing angle of the seeds are controlled by adjusting a position of the throwing point and a rotational speed of the seed spoon at the throwing point.

2. The seed metering device according to claim 1, wherein the seed feeding mechanism comprises a seed feeding motor and a seed feeding disc, the seed feeding motor is connected with the seed feeding disc and drives the seed feeding disc to rotate, an edge of the seed feeding disc is evenly provided with a plurality of seed suction holes along a circumferential direction, the seed feeding disc is matchedly provided with an air suction device to suck seeds to positions of the plurality of seed suction holes and rotates to feed seeds to the picking point, and when the seed spoon is overlapped with a position of corresponding seed suction hole at the picking point, linear speed of the seed spoon and linear speed of seeds in motion at a corresponding seed suction hole are consistent with each other to fetch the seeds at the same speed.

3. A seed metering control method through rotating and throwing, wherein the control method of the seed metering device according to claim 2 comprises following steps:
    step 1: determining a state of seeds at the throwing point and a speed of the seed spoon at the throwing point;
    wherein the linear speed $V_{2p}$ and the throwing angle $\theta$ of the seeds at a moment of being thrown are jointly determined by a horizontal distance $L_x$ and a vertical distance $L_y$ between the throwing point and the landing point, as well as a forward speed $V_t$ of a whole device and a gravity acceleration g, $V_{px}$ and $V_t$ have a same size and opposite directions, in which calculation formulas are as follows:

$$V_{2p} = \sqrt{V_{px}^2 + V_{py}^2};$$

$$\theta = \arctan\frac{V_{py}}{V_{px}};$$

$$V_{px} = V_t;$$

$$V_{py} = \frac{1}{2}\left(\frac{2L_y}{T_f} - gT_f\right);$$

$$T_f = \frac{L_x}{V_{px}};$$

a calculation formula of an angular speed $\omega_{2p}$ of the seed spoon at the throwing point is:

$$\omega_{2p} = \frac{V_{2p}}{r_2};$$

where $r_2$ is a radius for rotation motion of the seed spoon;
step 2: determining average angular speeds of a seed feeding disc and the seed spoon in rotation;
wherein the forward speed $V_t$ of the whole device and a seeding plant spacing $L_p$ are given, calculation formulas of an average angular speed $\omega_{1m}$ of the seed feeding disc and an average angular speed $\omega_{2m}$ of the seed spoon are as follows:

$$\omega_{1m} = \frac{2\pi V_t}{L_p Z};$$

$$\omega_{2m} = \frac{2\pi V_t}{L_p};$$

where Z is a number of seed suction holes on the seed feeding disc;
step 3: determining angular speeds of the seed feeding disc and the seed spoon at a picking time;
wherein a linear speed at which the seeds at the picking point move with the seed feeding disc is consistent with the linear speed at which the seed spoon fetches the seeds, an angular speed $\omega_{2q}$ of the seed spoon at the picking point and an angular speed $\omega_{1q}$ of the picking point of the seed feeding disc are obtained by following calculation formulas:

$$\omega_{2q} = 2\omega_{2m} - \omega_{2p};$$

$$\omega_{1q} = \frac{\omega_{2q} r_2}{r_1};$$

wherein $r_1$ is a radius for rotation motion of the seeds with the seed feeding disc;
step 4: obtaining rotating motion trajectories of the seed feeding disc and the seed spoon through angular speeds at various critical moments;
wherein the picking point is set as reference zero time and zero position, a speed curve $\omega_2(t)$ and a position curve $\theta_2(t)$ at which the seed spoon rotates for a period comprise an acceleration section and a deceleration section, which are divided into an acceleration process angular speed curve $\omega_{2a}(t)$, a deceleration process angular speed curve $\omega_{2d}(t)$, an acceleration process position curve $\theta_{2a}(t)$ and a deceleration process position curve $\theta_{2d}(t)$, and calculation formula of each curve trajectory is as follows:

$$\omega_{2a}(t) = \omega_{2m} - (\omega_{2m} - \omega_{2q})\cos\left(\frac{\pi}{T_{2a}}t\right) t \in [0, T_{2a});$$

$$\omega_{2d}(t) = \omega_{2m} + (\omega_{2m} - \omega_{2q})\cos\left[\frac{\pi}{T_{2d}}(t - T_{2a})\right] t \in [T_{2a}, T_{2s});$$

$$\theta_{2a}(t) = \int_0^t [\omega_{2a}(t)]dt \; t \in [0, T_{2a});$$

$$\theta_{2d}(t) = \int_{T_{2a}}^t [\omega_{2d}(t)]dt + \theta_{2a}(T_{2a}) \; t \in [T_{2a}, T_{2s});$$

where $[0, T_{2a})$ is an acceleration time period, $[T_{2a}, T_2)$ is a deceleration time period, $T_{2a}$ is a maximum acceleration time point of the seed spoon, $$T_{2a} = \frac{\theta_{th}}{\omega_{2m}},$$

$T_{2s}$ is a time spent for the seed spoon to rotate for a period, $$T_{2s} = \frac{2\pi}{\omega_{2m}},$$

$T_{2d}$ is a time spent for the seed spoon to move from the maximum acceleration time point to the picking point, $T_{2d} = T_{2s} - T_{2a}$;
wherein $\theta_{th}$ in is an angle through which the seed spoon rotates from the picking point to the throwing point, and when there is an included angle $\theta_0$ between the picking point of the seed spoon and the horizontal direction, following formula holds:

$$\theta_{th} = \frac{3\pi}{2} - \theta_0 - \theta;$$

a speed curve $\omega_1(t)$ and a position curve $\theta_1(t)$ formed by the seed feeding disc rotating for one picking period are calculated as follows:

$$\omega_1(t) = \omega_{1m} + (\omega_{1q} - \omega_{1m})\cos\left(\frac{2\pi}{T_{2s}}t\right) \; t \in [0, T_{2s});$$

$$\theta_1(t) = \int_0^t \omega_1(t)dt \; t \in [0, T_{2s}).$$

4. The seed metering control method through rotating and throwing according to claim 3, wherein in the step 1, position compensation is carried out to allow the landing points of the seeds relative to a rotation center of the seed spoon are consistent, and $L_x$ and $L_y$ after position compensation for different throwing points are respectively:

$$L_x = L_{x0} + r_2 \sin\theta;$$

$$L_y = L_{y0} - r_2 \cos\theta;$$

where $L_{x0}$ and $L_{y0}$ are a horizontal distance and a vertical distance between the landing point and the rotation center of the seed spoon, respectively.

5. The seed metering control method through rotating and throwing according to claim 3, wherein a jitter curve $\theta_{2v}(t)$ is superimposed on the deceleration process position curve $\theta_{2d}(t)$ after time $T_{2a}$ of the throwing point in the step 4, $\theta_{2v}(t)$ is a cosine trajectory in which a position jitter amplitude is A and an angular frequency is $\omega_v$, whose formulas are as follows:

$$\theta_{2v}(t) = -A + A\cos(\omega_v(t - T_{2a})) \ t \in [T_{2a}, T_{2a} + T_{2v});$$

$$T_{2v} = \frac{2\pi}{\omega_v},$$

where $(T_{2a}+T_{2v}) < T_{2s}$, $T_{2v}$ is a time of one period of a cosine trajectory $\theta_{2v}(t)$.

6. A seed metering control method through rotating and throwing, wherein for the seed metering device according to claim 1, the throwing speed and the throwing angle of the seeds are calculated as follows:

the linear speed $V_{2p}$ and the throwing angle $\theta$ of the seeds at a moment of being thrown are jointly determined by a horizontal distance $L_x$ and a vertical distance $L_y$ between the throwing point and a landing point, as well as a forward speed $V_t$ of a whole device and a gravity acceleration g, in which calculation formulas are as follows:

$$V_{2p} = \sqrt{V_{px}^2 + V_{py}^2};$$

$$\theta = \arctan\frac{V_{py}}{V_{px}};$$

where $V_{px}$ and $V_{py}$ are a horizontal component and a vertical component of the throwing speed of the seeds at the throwing point, respectively, $V_{px}$ and $V_t$ have a same size and opposite directions, in which:

$$V_{px} = V_t;$$

$$Y = \frac{1}{2}\left(\frac{2L_y}{T_f} - gT_f\right);$$

$$T_f = \frac{L_x}{V_{px}};$$

where $T_f$ is a flight time from throwing to landing of the seeds.

\* \* \* \* \*